US009036933B2

(12) United States Patent
Shimizu et al.

(10) Patent No.: US 9,036,933 B2
(45) Date of Patent: *May 19, 2015

(54) IMAGE ENCODING METHOD AND APPARATUS, IMAGE DECODING METHOD AND APPARATUS, AND PROGRAMS THEREFOR

(75) Inventors: Shinya Shimizu, Yokosuka (JP); Norihiko Matsuura, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 53 days.

This patent is subject to a terminal disclaimer.

(21) Appl. No.: 13/822,932

(22) PCT Filed: Sep. 20, 2011

(86) PCT No.: PCT/JP2011/071315
§ 371 (c)(1),
(2), (4) Date: Mar. 13, 2013

(87) PCT Pub. No.: WO2012/043294
PCT Pub. Date: Apr. 5, 2012

(65) Prior Publication Data
US 2013/0188707 A1 Jul. 25, 2013

(30) Foreign Application Priority Data
Sep. 29, 2010 (JP) ................................. 2010-218037

(51) Int. Cl.
*G06K 9/36* (2006.01)
*G06K 9/46* (2006.01)
(Continued)

(52) U.S. Cl.
CPC ......... *H04N 13/0048* (2013.01); *H04N 19/597* (2013.01); *H04N 19/176* (2013.01);
(Continued)

(58) Field of Classification Search
None
See application file for complete search history.

(56) References Cited

U.S. PATENT DOCUMENTS 5,838,455 A   11/1998   Imaizumi et al.
6,320,981 B1  11/2001   Yada
(Continued)

FOREIGN PATENT DOCUMENTS

JP  09-289638 A   11/1997
JP  2003-304562 A  10/2003
(Continued)

OTHER PUBLICATIONS

Morvan, Yannick, and Dirk Farin. "Platelet-based coding of depth maps for the transmission of multiview images." Electronic Imaging 2006. International Society for Optics and Photonics, 2006.*
(Continued)

*Primary Examiner* — Li Liu
(74) *Attorney, Agent, or Firm* — Harness, Dickey & Pierce, P.L.C.

(57) ABSTRACT

When the entire image is divided into regions, each of which is subjected to predictive encoding while predicting an image signal by using an independent method assigned to the region, the object number and a representative pixel value for each object are predicted utilizing spatial continuity for the presence of the object, and also using decoded pixel values of a previously-processed neighbor region adjacent to a processing region. Accordingly, it is possible to reduce the amount of code required for encoding the object number in the processing region or the pixel value as a representative of each object in the processing region, where these encoded items are required in highly accurate image signal prediction which can handle any object shape by utilizing the pixel value as a representative of each object in the processing target region and information for identifying the object assigned to each pixel in the processing region. Therefore, efficient image encoding can be implemented. Since the employed decoded pixel values of pixels in a previously-decoded neighbor region are common information between the encoding and decoding sides, appropriate prediction can be performed even in the case where one of multiple image signal prediction modes is selected for each region, like in H.264.

26 Claims, 33 Drawing Sheets

(51) Int. Cl.
| | |
|---|---|
| H04N 13/00 | (2006.01) |
| H04N 19/597 | (2014.01) |
| H04N 19/176 | (2014.01) |
| H04N 19/46 | (2014.01) |
| H04N 19/463 | (2014.01) |
| H04N 19/20 | (2014.01) |
| H04N 19/61 | (2014.01) |
| H04N 19/103 | (2014.01) |
| H04N 19/17 | (2014.01) |

(52) U.S. Cl.
CPC ............ *H04N 19/46* (2013.01); *H04N 19/463* (2013.01); *H04N 19/20* (2013.01); *H04N 19/61* (2013.01); *H04N 19/103* (2013.01); *H04N 19/17* (2013.01)

(56) References Cited

U.S. PATENT DOCUMENTS

| | | | |
|---|---|---|---|
| 7,245,768 B1* | 7/2007 | Harman et al. | 382/232 |
| 7,894,633 B1* | 2/2011 | Harman | 382/106 |
| 2002/0039441 A1 | 4/2002 | Klassen | |
| 2002/0154693 A1 | 10/2002 | Demos et al. | |
| 2004/0022322 A1 | 2/2004 | Dye | |
| 2005/0063596 A1 | 3/2005 | Yomdin et al. | |
| 2007/0269116 A1 | 11/2007 | Lo | |
| 2009/0097557 A1 | 4/2009 | Takahashi et al. | |
| 2010/0231688 A1* | 9/2010 | Park et al. | 348/42 |
| 2011/0206288 A1* | 8/2011 | Lee et al. | 382/233 |
| 2012/0200669 A1* | 8/2012 | Lai et al. | 348/43 |

FOREIGN PATENT DOCUMENTS

| | | |
|---|---|---|
| JP | 2006-148892 A | 6/2006 |
| JP | 2006-518157 A | 8/2006 |
| JP | 2009-212664 A | 9/2009 |
| JP | 2009-296338 A | 12/2009 |
| JP | 2010-157825 A | 7/2010 |
| JP | 2010-266982 A | 11/2010 |
| JP | 2012-074917 A | 4/2012 |
| WO | 98/15915 A1 | 4/1998 |
| WO | 01/84846 A2 | 11/2001 |
| WO | 2004/075531 A2 | 9/2004 |
| WO | 2009/112742 A1 | 9/2009 |

OTHER PUBLICATIONS

Shen, Godwin, et al. "Edge-aware intra prediction for depth-map coding." Image Processing (ICIP), 2010 17th IEEE International Conference on. IEEE, 2010.*
C. Fehn, P. Kauff, M. Op de Beeck, F. Ernst, W. IJsselsteijn, M. Pollefeys, L. Van Gool, E. Ofek and I. Sexton, "An Evolutionary and Optimised Approach on 3D-TV", Proceedings of International Broadcast Conference, pp. 357-365, Amsterdam, The Netherlands, Sep. 2002 (published on 2003).
W.H.A. Bruls, C. Varekamp, R. Klein Gunnewiek, B. Barenbrug and A. Bourge, "Enabling Introduction of Stereoscopic (3D) Video: Formats and Compression Standards", Proceedings of IEEE International Conference on Image Processing, pp. I-89 to I-92, San Antonio, USA, Sep. 2007.
A. Smolic, K. Mueller, P. Merkle, N. Atzpadin, C. Fehn, M. Mueller, O. Schreer, R. Tanger, P. Kauff and T. Wiegand, "Multi-view video plus depth (MVD) format for advanced 3D video systems", Joint Video Team of ISO/IEC JTC1/SC29/WG11 and ITU-T SG16 Q.6, Doc. JVT-W100, San Jose, USA, Apr. 2007.
C. L. Zitnick, S. B. Kang, M. Uyttendaele, S. A. J. Winder, and R. Szeliski, "High-quality Video View Interpolation Using a Layered Representation", ACM Transactions on Graphics, vol. 23, No. 3, pp. 600-608, Aug. 2004.
Recommendation ITU-T H.264, "Advanced video coding for generic audiovisual services", Mar. 2009.
Shin'ya Shimizu et al., "Kokoritsu Depth Map Fugoka no Tameno Object Base Yosoku Hoshiki", The Institute of Image Electronics Engineers of Japan Nenji Taikai Yokoshu (CD-ROM), The Institute of Image Electronics Engineers of Japan, Jun. 25, 2011, Dai 39 Kai, R1-4.
Kunio Nobori et al., "Object-based image coding using range data", The Institute of Electronics, Information and Communication Engineers Sogo Taikai Koen Ronbunshu, The Institute of Electronics, Information and Communication Engineers, Mar. 8, 1999, Joho System (2), p. 64.
D.V.S.X. De Silva et al., Object Based Coding of the Depth Maps for 3D Video Coding, Consumer Electronics, IEEE Transactions on, IEEE, Aug. 31, 2009, vol. 55, Issue:3, p. 1699-1706.
Shin'ya Shimizu et al., Block-Adaptive Palette-Based Prediction for Depth Map Coding, 18th IEEE International Conference on Image Processing, 2011, pp. 117-120.
International Search Report for PCT/JP2011/071315 (in Japanese and English), mailed Nov. 8, 2011; ISR/JP.
Zhu, Bo, et al., "View Synthesis Oriented Depth Map Coding Algorithm," 2009 Asia-Pacific Conference on Information Processing, pp. 104-107.
Lie, Wen-Nung, et al., "Multi-spectral Satellite Image Compression Based on Multi-Mode Linear Prediction," Proc. of SPIE, Visual Communications and Image Processing, 2000, pp. 848-855.
Office Action, Taiwanese Patent Application No. 100134544, Jul. 16, 2014.
Morvan, Yannick, et al., "Depth-Image Compression Based on an R-D Optimized Quadtree Decomposition for the Transmission of Multiview Images," IEEE International Conference on Image Processing, Sep. 1, 2007, pp. V-105-V-108.
Search Report, International Patent Application No. PCT/JP2011/071463, Nov. 8, 2011.
Search Report, International Patent Application No. PCT/JP2012/056442, Jun. 19, 2012.
Search Report, European Patent Application No. 12757661.9, Oct. 21, 2014.
Search Report, European Patent Application No. 11828887.7, Jun. 18, 2014.
Office Action, Taiwanese Patent Application No. 100134543, Oct. 13, 2014.
Tzovaras, Dimitrios, et al., "Object-Based Coding of Stereo Image Sequences Using Joint 3-D Motion/Disparity Compensation," IEEE Transactions on Circuits and Systems for Video Technology, vol. 7, No. 2, Apr. 1997, pp. 312-327.
Ebrahimi, Touradj, et al., "MPEG-4 natural video coding—An overview," Signal Processing: Image Communication, vol. 15, Nos. 4-5, Jan. 2000, pp. 365-385.
Search Report, European Patent Application No. 11828851.3, Jun. 18, 2014.
Notice of Non-Final Rejection, Korean Patent Application No. 10-2013-7023849, Feb. 26, 2015.
Examination Report from the Intellectual Property Office, Taiwanese Patent Application No. 101108263, Mar. 20, 2015.

* cited by examiner

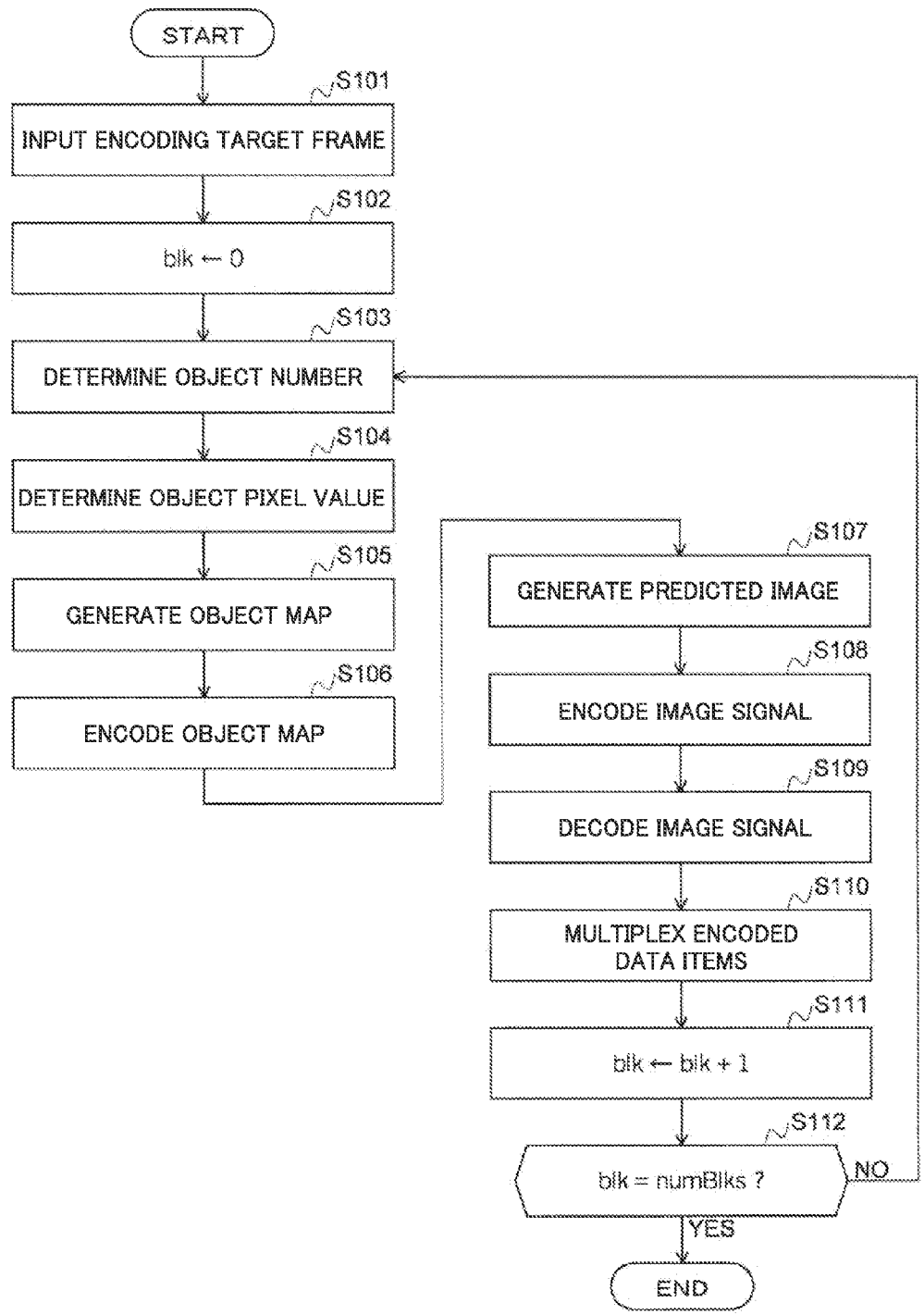

| 0 | 0 | 0 | 0 | 0 | 0 | 0 | 2 |
|---|---|---|---|---|---|---|---|
| 0 | 0 | 0 | 0 | 0 | 0 | 2 | 2 |
| 0 | 0 | 0 | 0 | 1 | 1 | 2 | 2 |
| 0 | 0 | 0 | 0 | 1 | 1 | 1 | 2 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 1 | 1 | 1 | 1 | 1 | 1 | 1 | x: ENCODING TARGET PIXEL
a,b,c: REFERENCE PIXEL

FIG. 15

| 0 | 0 | 0 | 0 | 0 | 2 | 2 | 2 |
|---|---|---|---|---|---|---|---|
| 0 | 0 | 0 | 0 | 2 | 2 | 2 | 2 |
| 0 | 0 | 0 | 0 | 1 | 1 | 2 | 2 |
| 0 | 0 | 0 | 0 | 1 | 1 | 1 | 2 |
| 0 | 0 | 0 | 0 | 1 | 1 | 1 | 2 |
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |

FIG. 19

```
mb_type
If (mb_type == MAP_BASED_PRED)
{
        map_object
        residuals
}
```

FIG. 20

```
mb_type
If (mb_type == MAP_BASED_PRED)
{
        diff_num_objects
        map_object
        for ( i=0; i<num_objects; i++)
        {
                if ( exist(i, map_object) == TRUE )
                        residual_value_object[i]
        }
}
residuals
```

IMAGE ENCODING METHOD AND APPARATUS, IMAGE DECODING METHOD AND APPARATUS, AND PROGRAMS THEREFOR

TECHNICAL FIELD

The present invention relates to image encoding and decoding techniques, and in particular, relates to an image encoding method, an image decoding method, an image encoding apparatus, an image decoding apparatus, and programs therefor, which are suitable for coding an image such as a distance image.

Priority is claimed on Japanese Patent Application No. 2010-218037, filed Sep. 29, 2010, the contents of which are incorporated herein by reference.

BACKGROUND ART

A distance image is an image in which the distance from a camera to an object (or subject) is represented by a pixel value. Since the distance from a camera to an object can be defined as the depth of a scene, the distance image is often called a "depth image". In addition, it is sometimes called a "depth map". In the technical field of computer graphics, since the depth is information stored in a Z buffer (i.e., a memory region for storing depth values of the entire image), the distance image is often called a "Z image" or a "Z map". Additionally, instead of the distance from a camera to an object, coordinate values for the Z axis in a three-dimensional coordinate system in space may be used to represent a distance (or depth).

Generally, in an obtained image, the X and Y axes are respectively defined as the horizontal and vertical directions, and the Z axis is defined in the direction of the relevant camera. However, when, for example, a common coordinate system is used between a plurality of cameras, the Z axis may not be defined in the direction of a camera.

Below, distance, depth, and Z values (depth information) are not distinguished from each other, and are commonly called "distance information". Additionally, an image in which distance information is represented by pixel values is called a "distance image".

In order to represent distance information by using pixel values, there are three methods: (i) a method in which values corresponding to physical quantities are directly defined as pixel values, (ii) a method that uses values obtained by quantizing a section between the minimum and maximum values into discrete values, and (iii) a method that uses values obtained by quantizing a difference from the minimum value by using a specific step width. When the range for desired representation has a considerable limit, distance information can be highly accurately represented by using additional information such as the minimum value.

In addition, when performing quantization at regular intervals, there are two methods: a first method of directly quantizing physical values, and a second method of quantizing the inverse numbers of physical values. Generally, the inverse number of the distance image is proportional to disparity. Therefore, in order to highly accurately represent the distance information, the former method is often used. Oppositely, in order to highly accurately represent disparity information, the latter method is often used.

Below, regardless of the method of representing the distance image using pixel values or the quantization method, any image as a representative of distance information is called "distance information".

The distance image may be applied to 3D image. In a generally known 3D image representation, a stereographic image consists of a right-eye image and a left-eye image of an observer. A 3D image may also be represented using an image obtained by a certain camera and a distance image therefor (refer to Non-Patent Document 1 for a detailed explanation thereof).

In order to encode a 3D image represented using a video image at a specific viewpoint and a distance image, the method defined by MPEG-C Part 3 (ISO/IEC 23002-3) can be used (refer to Non-Patent Document 2 for a detailed explanation thereof).

In addition, when such a video and a distance image are obtained for a plurality of viewpoints, a 3D image having a disparity larger than that obtained by a single viewpoint can be represented (refer to Non-Patent Document 3 for a detailed explanation thereof).

Instead of representing the above-described 3D image, the distance image is also used as one of data items for generating a free-viewpoint image by which the observer's viewpoint can be freely shifted without consideration of the camera arrangement. Such a synthetic image obtained by assuming an observation of a scene from a camera other than cameras which are actually used for imaging may be called a "virtual viewpoint image", where methods for generating the virtual viewpoint image have been actively examined in the technical field of image-based rendering. Non-Patent Document 4 discloses a representative method for generating the virtual viewpoint image based on a multi-viewpoint video and a distance image.

Since a distance image is formed using a single component, it can be regarded as a gray-scale image. Additionally, an object is present continuously in a real space, and thus it cannot instantaneously move to a distant position. Therefore, similar to image signals, the distance image has spatial and temporal correlation. Accordingly, it is possible to efficiently encode a distance image or a distance video by using an image or video encoding method used for encoding an ordinary image or video signal, while removing spatial or temporal redundancy. Actually, in MPEG-C Part 3, distance video image encoding is assumed to be performed by an existing video encoding method.

Below, a known method of encoding an ordinary video signal will be explained.

Since each object generally has spatial and temporal continuity in real space, appearance of the object has high spatial and temporal correlation. In the video signal encoding, an efficient encoding is achieved utilizing such correlation.

More specifically, the video signal of an encoding target block is predicted based on the video signal of a previously-encoded video signal, and only a residual signal thereof is encoded, thereby reducing information which should be encoded and implementing a high degree of encoding efficiency.

As a representative method of predicting a video signal, there are (i) intra frame prediction that spatially generates a predicted signal based on neighbor (or neighboring) blocks, and (ii) motion compensation prediction that estimates movement of an object in accordance with previously-encoded frames obtained at different times, so as to temporally generate a predicted signal.

In addition, in order to utilize spatial correlation and characteristics of human visual systems, a prediction error called a prediction residual signal is transformed into data in a frequency domain by using DCT or the like, so that energy of the residual signal is concentrated into a low-frequency region, thereby the efficient encoding is achieved.

Detailed explanations of each method can be found in international standards for video encoding, such as MPEG-2 or H.264/MPEG-4 AVC (see Non-Patent Document 5).

PRIOR ART DOCUMENT

Patent Document

Non-Patent Document 1: C. Fehn, P. Kauff, M. Op de Beeck, F. Ernst, W. Usselsteijn, M. Pollefeys, L. Van Gool, E. Ofek and I. Sexton, "An Evolutionary and Optimised Approach on 3D-TV", Proceedings of International Broadcast Conference, pp. 357-365, Amsterdam, The Netherlands, September 2002.

Non-Patent Document 2: W. H. A. Bruls, C. Varekamp, R. Klein Gunnewiek, B. Barenbrug and A. Bourge, "Enabling Introduction of Stereoscopic (3D) Video: Formats and Compression Standards", Proceedings of IEEE International Conference on Image Processing, pp. 1-89 to 1-92, San Antonio, USA, September 2007.

Non-Patent Document 3: A. Smolic, K. Mueller, P. Merkle, N. Atzpadin, C. Fehn, M. Mueller, O. Schreer, R. Tanger, P. Kauff and T. Wiegand, "Multi-view video plus depth (MVD) format for advanced 3D video systems", Joint Video Team of ISO/IEC JTC1/SC29/WG11 and ITU-T SG16 Q.6, Doc. JVT-W100, San Jose, USA, April 2007.

Non-Patent Document 4: C. L. Zitnick, S. B. Kang, M. Uyttendaele, S. A. J. Winder, and R. Szeliski, "High-quality Video View Interpolation Using a Layered Representation", ACM Transactions on Graphics, vol. 23, no. 3, pp. 600-608, August 2004.

Non-Patent Document 5: Recommendation ITU-T H.264, "Advanced video coding for generic audiovisual services", March 2009.

DISCLOSURE OF INVENTION

Problem to be Solved by the Invention

Since each object (subject) is continuous in real space, it has a high spatial correlation. In addition, since each object cannot instantaneously move to a distant place, it has a high temporal correlation. Therefore, an existing video encoding method using spatial and temporal correlation can be used to efficiently encode a distance image represented as a gray scale image.

However, there is small variation inside each object, while there is a large difference between objects. Therefore, the result of spatial or temporal prediction is one of accurate prediction which produces a very small prediction error and totally ineffective prediction which produces a very large prediction error. That is, a sharp edge is generated in the prediction residual image. When the prediction residual image is transformed into data in a frequency domain by using DCT or the like, the above-described edge obstructs energy concentration of the residual signal onto the low-frequency region, so that various high frequency components are produced. As a result, it is impossible to achieve an efficient encoding of the residual signal.

FIG. 30 shows an example of a 9×9 pixel block of a distance image. Two objects are present in this block, one of them having a pixel value of approximately 50 and the other having a pixel value of approximately 200.

In spatial prediction, 8×8 pixels except for information of the first line and the first column of this block are predicted. Although various prediction methods can be used, typical two prediction methods such as horizontal prediction and vertical prediction, which are employed in H.264, are explained here.

As shown on the right side of FIG. 23, the prediction residual has only three groups of values, such as approximately −150, 0, and 150, which causes considerably sharp edges.

FIGS. 31A and 31B show results of subjecting the prediction residual shown in FIG. 30 to 8×8 two-dimensional DCT. The direct current (DC) component is present in the backmost area in each figure, and the larger the distance from the backmost area, the higher the frequency.

As shown in the figures, in either case, large-size signals are produced in many high-frequency areas, which indicates a failure in downsizing of the residual signal.

Although encoding can be performed by using only transformation such as DCT without performing prediction, it is impossible to exclude spatial correlation with another block, which further degrades the encoding efficiency.

In addition, although encoding can be performed without performing transformation such as DCT, it is impossible to utilize local correlation within the relevant block, so that efficient encoding cannot be achieved.

It is generally said that high-frequency components do not affect subjective quality very much. Therefore, even for the above-described signal, it is possible to reduce the amount of generated code by, for example, subjecting high-frequency components to large-scale quantization. However, when high frequency components on strong edges are quantized as shown in the above-described example, image quality is significantly degraded since distortion called mosquito noises appears around the edges.

In light of the above circumstances, an object of the present invention is to provide an image encoding technique for efficiently encoding an image (e.g., distance image) whose pixel values considerably depend on the object, and an image decoding technique for decoding the relevant encoded bitstream.

Means for Solving the Problem

The present invention relates to image encoding in which when transmitting or storing an image, a frame of the image is divided into predetermined-sized processing regions (which may be called "blocks" below), and for each block, the pixel value of each pixel is predicted for the encoding. In order to solve the above problems, the present invention assumes that a fixed or variable number of objects are present in each block, and the image of each block is represented using information items such as a pixel value that represents each object (called an "object pixel value") and object identification information for each pixel.

That is, an object identification information item assigned to each pixel in a block represents an object of the pixel, and a specific object pixel value is assigned to each object identification information item.

Since the closest value according to such information is assigned to each pixel, a predicted image that maintains a complex edge shape can be generated. Here, only a few objects are included in each block at most. Therefore, the amount of the above information is limited.

In particular, in the present invention, the number of objects or each object pixel value in an encoding target block, or both of them, are predicted using image signals of previously-encoded neighbor (or neighboring) pixels for the encoding target block. When performing the prediction using image signals of previously-encoded pixels, the decoding side can have the same information as that possessed on the encoding side, thereby reducing the amount of code required for additional information used for generating a predicted image.

The "object" of this specification does not indicate each body or human itself to be imaged but a target to which information is applied, in other words, a region having similar image signals (about luminance, color, or depth). That is, even a single body is regarded as a plurality of objects if the body has different colors at divided regions.

In addition, a body or a part of a body, for which no encoding of image signals is required, is not determined to be an object. That is, the object does not relate to real objects in the frame, and each real object to which no information is applied is not an "object" of the present invention. Additionally, if two information items are applied to one real object, two separate objects are defined.

Below, terms used in explanations of the present invention and embodiments therefor will be explained, where processing regions are represented by blocks.

Object Number

The object number indicates the number of objects that are present in each block, and the number of targets to which information is applied. The object number can be generated by analyzing the pixel values in the block.

For example, pixels in a block are subjected to clustering using information such as pixel values or positions, and the maximum value for the number of clusters, each of which has a score (e.g., variance of the pixel values) smaller than or equal to a specific value, may be determined to be the object number. In other examples, the object number may be provided from an external device based on experiences or the like, or may be set to a predetermined value.

The object number is used to represent the number of object pixel values which are one of additional information items, and also for representing the maximum value of object identifiers which are shown in an object map.

Object Pixel Value

One object pixel value is assigned to each "object", and is representative of the object. As the pixel value, luminance, color difference value, or R value may be used. In addition, a set of color component values (e.g., RGB values) may be used.

The object pixel value is generated by analyzing the pixel values in a block. Specifically, pixels in the block are subjected to clustering using information such as pixel values or positions, where the pixels are assigned to the clusters for the object number, and an average or median for the pixel values of the pixels included in each cluster is computed.

For each pixel in the relevant block, an object pixel value corresponding to the "object" of the pixel is assigned to the pixel, and is used for generating a predicted image of the block.

Object Map

The object map indicates which "object" is present at each pixel in a target block. Specifically, each pixel is represented using an object identifier associated with an "object" (i.e., object pixel value). The object map can be represented using a two-dimensional structure in most simple representation, and can also be represented using a tree structure. The object map is generated by assigning an object identifier to each pixel in the block, where the object identifier corresponds to an object pixel value that is most approximate to the pixel value of the pixel.

In addition to the similarity between the pixel value and the object pixel value, the number of bits required for representing the object map itself may also be considered to generate the object map. When generating a predicted image, the object map is used for indicating which object pixel value is assigned to each pixel in the block.

Additional Information

In the present invention, information used for predicting an image (or video) signal of a processing target frame is called "additional information", which is generated for each block to be processed. Basically, the additional information consists of three information items such as the object number, the object pixel value, and the object map.

Predicted Additional Information

Predicted additional information is a predicted value for the additional information. Specifically, the predicted additional information consists of a predicted value for the object number and a predicted value for the object pixel value.

The predicted value for the object number can be generated by analyzing pixel values of a group of previously-processed neighbor pixels for a processing target block. For example, a group of previously-processed neighbor pixels for the processing target block are subjected to clustering by using information such as pixel values or positions, and the minimum value for the number of clusters, each of which has a score (e.g., variance of the pixel values) smaller than or equal to a specific value, may be determined to be the predicted value for the object number.

The predicted value for the object pixel value can be generated by analyzing pixel values of a group of previously-processed neighbor pixels for a processing target block. For example, a group of previously-processed neighbor pixels for the processing target block are subjected to clustering by using information such as pixel values or positions, where the pixels are assigned to the clusters for the object number, and a computed average or median for the pixel values of the pixels included in each cluster may be determined to be the predicted value for the object pixel value.

In another example, the previously-processed pixels are subjected to clustering, where the pixels are assigned to the clusters, the number of which is identical to the predicted object number, and a computed average or median for the pixel values of the pixels included in each cluster may be employed.

Furthermore, values obtained using the above-described method may be placed in a numerical order, and the predicted value may be generated using both a value obtained by the above-described method and the object pixel value to which an object identifier smaller than the corresponding number in the sequential order is assigned.

The predicted additional information is defined as predicted values which are used when encoding or decoding the additional information. That is, when encoding the additional information except for the object map, a difference between a value included in the additional information and a corresponding value included in the predicted additional information is computed, and the difference value is encoded.

When decoding the additional information except for the object map, a value for the additional information is generated by adding a value included in the predicted additional information to a corresponding value obtained by decoding the relevant encoded data.

Here, part or all of difference values may not be encoded, and values of the predicted additional information themselves may be directly used as values of the additional information.

Typically, image encoding of the present invention performs:

(1) to determine an object number that indicates the number of objects present in a processing target block, where the object number may be set to a predetermined object number;

set by analyzing pixel values in the block; or set to an object number predicted using previously-encoded neighbor image information for the block;

(2) to assume that objects corresponding to the object number are present in the block, and determine one pixel value, which is assigned to each object and associated with an object identifier for identifying the object, to be an object pixel value, where the object pixel value may be set by analyzing pixel values in the block, or be determined by predicting an object pixel value by using previously-encoded neighbor image information for the block;

(3) to generate, based on the pixel value and the object pixel value of each pixel in the block, an object map that indicates which object has been obtained at each pixel in the block, by using the object identifier;

(4) to generate a predicted image for the block by assigning the object pixel value to each pixel in accordance with the object map;

(5) to encode the object map; and (6) to perform predictive encoding of an image signal for the block by using the predicted image.

(7) The object number is encoded in a certain case, and is not encoded in another case.

In the above step (1) of determining the object number, when it is set to a predetermined object number or an object number predicted using previously-encoded neighbor image information for the block, identical information can be obtained on the decoding side by using previously-decoded image information, so that no encoding is performed. When the object number is set by analyzing pixel values in the block, the object number is subjected to predictive encoding so as to reduce the amount of code required for the object number. That is, the difference between an actual object number and an object number predicted using previously-encoded neighbor image information for the block is encoded.

(8) Similarly, the object pixel value is encoded in a certain case, and is not encoded in another case. In the above step (2) of determining the object pixel value, when it is set to an object pixel value predicted using previously-encoded neighbor image information for the block, identical information can be obtained on the decoding side by using previously-decoded image information, so that no encoding is performed. When the object pixel value is set by analyzing pixel values in the block, the object pixel value is subjected to predictive encoding so as to reduce the amount of code required for the object pixel value. That is, the difference between an object pixel value used for generating a predicted image and an object pixel value predicted using previously-encoded neighbor image information for the block is encoded. In addition, if there are object pixel values which are placed in the ascending order, an increase from an object pixel value immediately before may be encoded.

(9) Encoded data of the object map, encoded data of the image signal, encoded data of the object number if it is encoded, and encoded data of the object pixel value if it is encoded are multiplexed, and the multiplexed data is output.

As described above, in order to generate a predicted image in the present invention, two additional information items are used, which are the object pixel value that is a representative pixel value of each object and the object map that indicates, for each pixel, which object pixel value is used for generating the predicted image. The information items are determined according to the object number.

In comparison with conventional techniques which use "prediction direction" for generating a predicted image, although the present invention increases the amount of code required for the additional information, it substantially reduces the amount of code required for encoding the prediction residual, so that the total amount of code required for one block can be reduced.

Additionally, the amount of code required for the additional information can also be reduced by prediction. That is, even in an image including blocks that have different numbers of objects on the image, the amount of code required for representing the object number can be reduced by using the predicted object number.

For blocks having different numbers of objects on the image, two cases may be supposed: one case in which an object is present in a neighbor region, but is not present in the current block, and the other case in which an object is present in the current block, but is present in no neighbor region. That is, the object number of the current block increases or decreases from the object number (as a reference) of a neighbor region.

Therefore, in order to encode the object number of the current block, information about the increase or decrease in the object number may be encoded instead of directly encoding the object number, thereby reducing the amount of required code.

Similarly, for an image that includes blocks having different object types (colors or the like), the amount of code required for representing the object pixel value (as a representative of each object) can be reduced by using a predicted object pixel value.

For blocks having different object colors, two cases may be supposed: case (a) having the same object in both the current and neighbor regions but having different lighting effects, and case (b) where no same object is present in a neighbor region.

In case (a) where there is a different lighting effect, since the two colors belong to the same object, the difference from the reference color of the neighbor region is a variation of the reference color. Therefore, in order to encode the object pixel value of the current block, information about the variation in the object pixel value may be encoded instead of directly encoding the object pixel value, thereby reducing the amount of required code.

In case (b) for a new object, since that object has not been present in the neighbor region, it cannot be said that the relevant predicted object pixel value is an effective predicted value. However, if the object pixel values are encoded in the ascending order, information about an increase from the object pixel value encoded immediately before may be encoded instead of directly encoding the object pixel value, thereby reducing the amount of required code.

Typically, image decoding of the present invention performs:

(1) to determine an object number that indicates the number of objects present in a block as the processing target, where the object number may be set to a predetermined object number; set to an object number predicted using previously-decoded image information around the block; or set to an object number obtained by decoding encoded data. In case of obtaining the object number by decoding encoded data, decoding is performed using an object number predicted based on previously-decoded image information around the relevant block;

(2) to determine an individual object pixel value assigned to each object identifier, where the object pixel value may be set to an object pixel value predicted using previously-decoded neighbor image information for the block; or set to an object pixel value obtained by decoding encoded data. In the case of obtaining the object pixel value by decoding encoded data, decoding is performed using an object pixel value predicted based on previously-decoded neighbor image information for the relevant block, or an object pixel value decoded immediately before;
(3) to decode an object map from encoded data;
(4) to generate a predicted image for the block by assigning the relevant object pixel value to each pixel in accordance with the object map;
(5) to decode, from the encoded data, an image signal for the block by using the predicted image.

Accordingly, the image encoded by the above-described image encoding can be decoded.

Effect of the Invention

In accordance with the present invention, for an image (e.g., distance image) that has pixel values determined considerably depending on objects, and locally has a limited number of objects, when the entire image is divided into regions, each of which is subjected to predictive encoding while predicting an image signal by using an independent method assigned to the region, the object number and a representative pixel value for each object are predicted utilizing spatial continuity for the presence of the object. Accordingly, it is possible to reduce the amount of code required for representing additional information used for the image signal prediction that employs a representative pixel value and object identification information assigned to each object, thereby implementing efficient image coding.

BRIEF DESCRIPTION OF THE DRAWINGS

FIG. 2 is a flowchart explaining the operation of the image encoding apparatus in the first embodiment.

FIG. 15 is a diagram showing another example of the decoded object map.
FIG. 19 is a flowchart showing an example of syntax applied to encoded data of each block.
FIG. 20 is a flowchart showing another example of syntax applied to encoded data of each block.

MODE FOR CARRYING OUT THE INVENTION

In the present invention, when the entire image is divided into regions, each of which is subjected to predictive encoding while predicting an image signal by using an independent method assigned to the region, the object number and a representative pixel value for each object are predicted utilizing spatial continuity for the presence of the object, and also using decoded pixel values of a previously-processed neighbor region adjacent to a processing region.

Accordingly, it is possible to reduce the amount of code required for encoding the object number in the processing region or the pixel value as a representative of each object in the processing target region, where these encoded items are required in highly accurate image signal prediction which can handle any object shape by utilizing the pixel value as a representative of each object in the processing target region and information for identifying the object assigned to each pixel in the processing region. Therefore, efficient image encoding can be implemented.

In addition, since the employed decoded pixel values of pixels in a previously-processed neighbor region are common information between the encoding and decoding sides, appropriate prediction can be performed even in the case where one of multiple image signal prediction modes is selected for each region, like in H.264.

Below, embodiments of the present invention will be explained with reference to the drawings.

First Embodiment

Image Encoding Apparatus

A first embodiment will be explained first.

Figure 1:
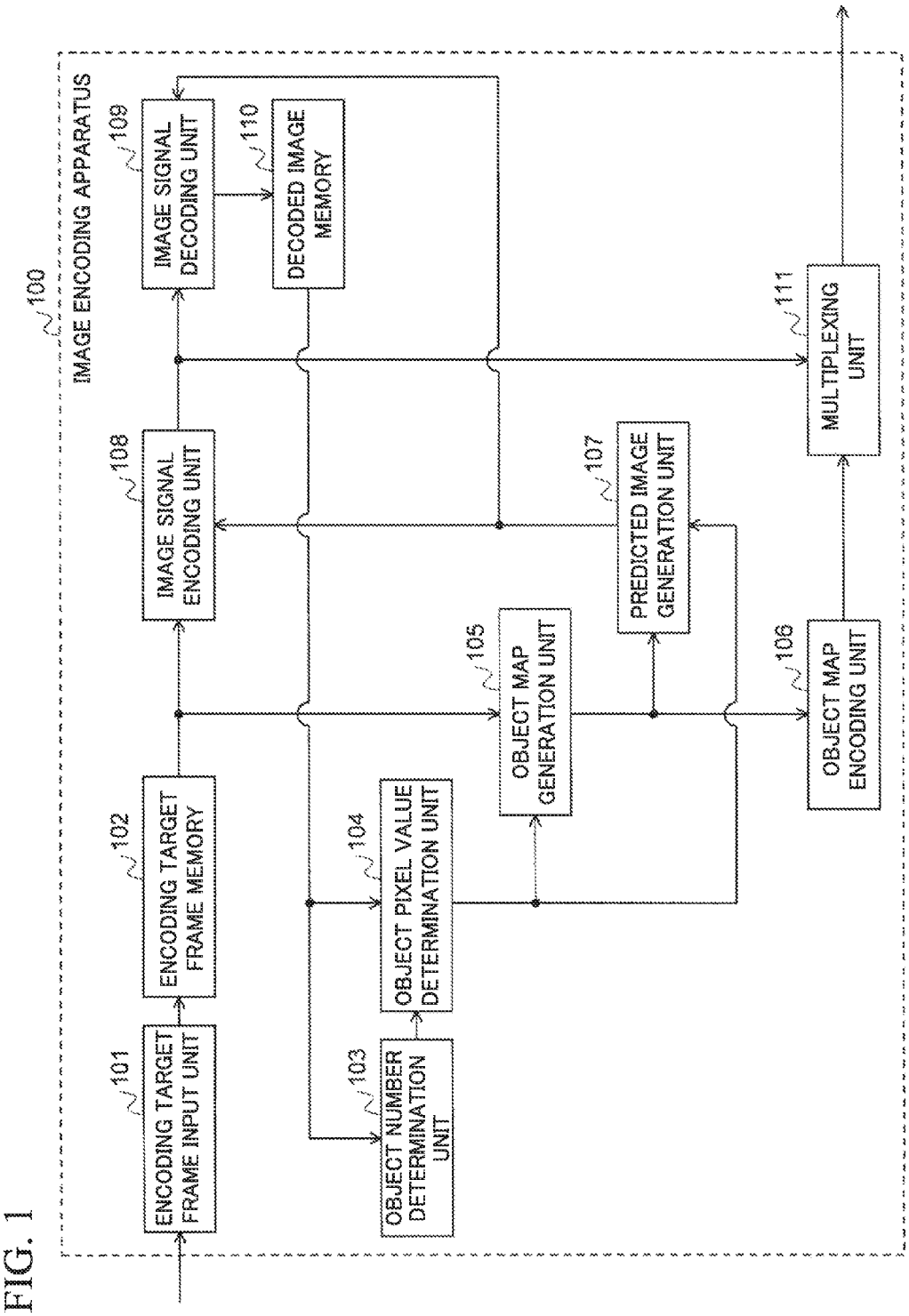
FIG. 1 is a block diagram showing the structure of an image encoding apparatus as the first embodiment of the present invention.

FIG. 1 is a block diagram showing the structure of an image encoding apparatus as the first embodiment of the present invention.

As shown in FIG. 1, an image encoding apparatus 100 has an encoding target frame input unit 101, an encoding target frame memory 102, an object number determination unit 103, an object pixel value determination unit 104, an object map generation unit 105, an object map encoding unit 106, a predicted image generation unit 107, an image signal encoding unit 108, an image signal decoding unit 109, a decoded image memory 110, and a multiplexing unit 111.

The encoding target frame input unit 101 receives an image frame as an encoding target.

The encoding target frame memory 102 stores the received encoding target frame.

The object number determination unit 103 determines the object number for objects included in a processing region having a predetermined size.

The object pixel value determination unit 104 assumes that a specified number of objects are present in the processing region, and determines a pixel value as a representative of each object, by using a decoded image adjacent to the processing region. The pixel value as the representative of each object (i.e., the pixel value generated for each object in the processing region) is called the object pixel value.

The object map generation unit 105 generates an object map for identifying the object obtained at each pixel in the processing region.

The object map encoding unit 106 encodes the object map.

The predicted image generation unit 107 generates a predicted image for the processing region, based on each object pixel value and the object map which were generated for the processing region.

The image signal encoding unit 108 encodes, for each processing region, an image signal of the encoding target frame by using the predicted image.

The image signal decoding unit 109 decodes, for each processing region, encoded data of the image signal of the encoding target frame by using the predicted image.

The decoded image memory 110 stores the decoded image signal.

The multiplexing unit 111 multiplexes encoded data of the object map and encoded data of the image signal of the encoding target frame, and outputs the multiplexed data.

FIG. 2 is a flowchart explaining the operation of the image encoding apparatus 100 in the first embodiment. According to the flowchart, the operation executed by the image encoding apparatus 100 will be explained in detail.

First, the encoding target frame input unit 101 receives an encoding target frame, which is stored in the encoding target frame memory 102 (see step S101).

After the encoding target frame is stored, it is divided into regions, and the image signal of the encoding target frame for each divided region is encoded (see steps S102 to S112).

More specifically, given "blk" for an encoding target block index and "numBlks" for the total number of encoding target blocks, blk is initialized to be 0 (see step S102), and then the following process (from step S103 to step S110) is repeated adding 1 to blk each time (see step S111) until blk reaches numBlks (see step S112).

In the process repeated for each encoding target block, first, the object number determination unit 103 determines the number of objects ("numObjs") included in block blk by using image signals of neighbor pixels for block blk, which are stored in the decoded image memory 110 (see step S103).

The set of the neighbor pixels for block blk, which is stored in the decoded image memory 110, is called the first reference pixels. Any methods which should be common between the encoding and decoding sides can be used for selecting the first reference pixels and for determining the object number numObjs based on the pixel values for the first reference pixels.

Regarding the selection of the first reference pixels, they may be set to a group of pixels having a predetermined positional relationship. Additionally, information that indicates the selection method applied to each unit (e.g., frame or a group of blocks) may be encoded so as to be communicated to the decoding side.

In order to determine the object number numObjs, the reference pixels may be subjected to clustering using, for example, a K-means method or Affinity Propagation, so that the minimum number of clusters, in each of which variance for the pixel values is smaller than or equal to a predetermined value, is determined to be numObjs. The criterion for the clustering may be only the pixel value, or may be both the pixel value and the pixel position.

Figure 3A:
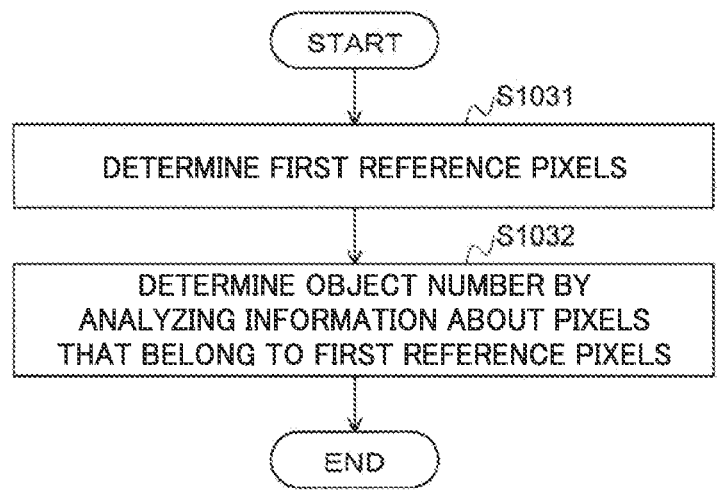
FIG. 3A is a flowchart explaining an object number determination process.
Figure 3B:
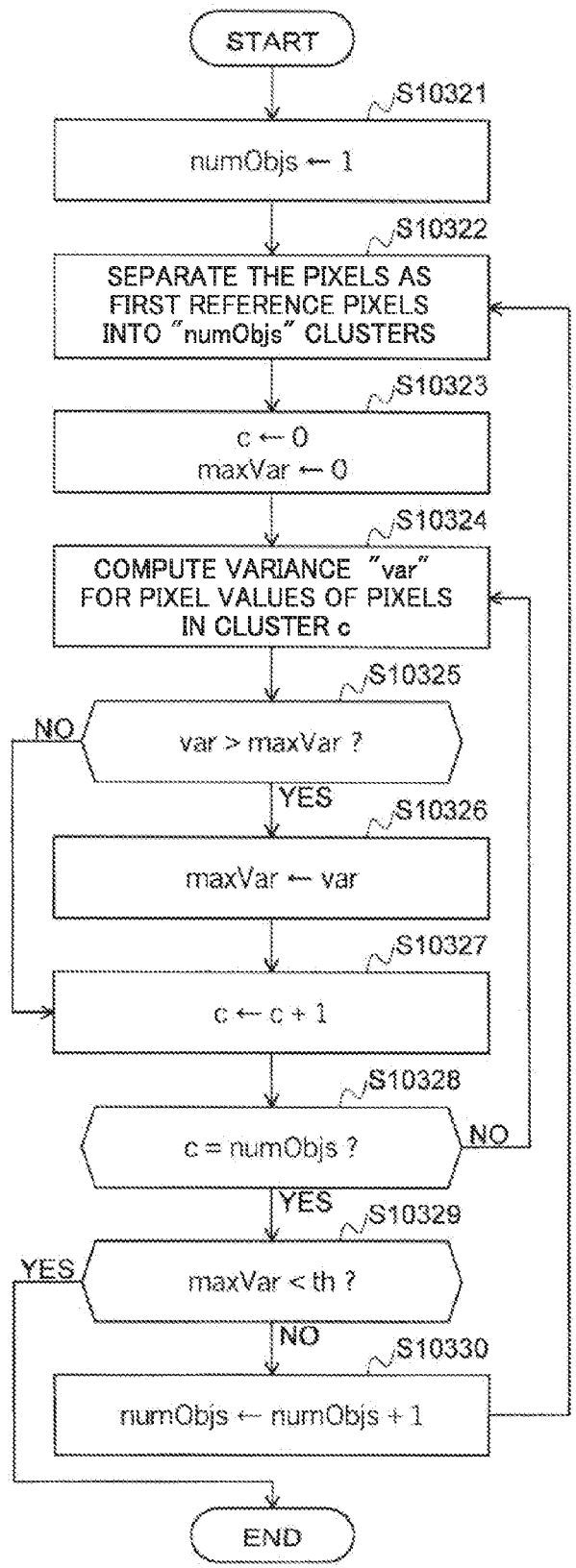
FIG. 3B is also a flowchart explaining the object number determination process.

FIGS. 3A and 3B show detailed flowcharts for the process of determining the object number (in step S103 in FIG. 2).

As shown in FIG. 3A, the process of determining the object number first determines the first reference pixels, which are stored in the decoded image memory 110 and which function as a set of neighbor pixels for block blk (see step S1031).

Next, the object number is determined by analyzing information (for position or pixel value) about individual pixels that belong to the first reference pixels (see step S1032).

FIG. 3B shows a detailed operation flow of the above step S1032.

First, the object number numObjs is initialized to 1 (see step S10321). After that, the pixels handled as the first reference pixels are separated into clusters, the number of which is numObjs (see step S10322). In each cluster, variance "var" for pixel values of the pixels in the cluster is computed, and the maximum value of the computed variances is defined as "maxVar" (see steps S10323 to S10328).

If maxVar is smaller than a predetermined threshold "th" (see step S10329), the object number is set to the current "numObjs", and the relevant operation is terminated.

Otherwise, 1 is added to numObjs (see step S10330), and the operation is returned to the clustering step (S10322) so as to repeat a similar operation.

The object number may be set to a constant value without using the first reference pixels.

In addition, if the object number is large, the amount of code required for the object map (explained later) becomes large, so that efficient encoding cannot be implemented. Therefore, a maximum value may be applied to the object number so that the object number is set within a range that does not exceed the maximum value.

After completing the determination of the object number, the object pixel value determination unit 104 assigns a pixel value to each object (i.e., a representative pixel value for the object) in block blk, by using image signals (stored in the decoded image memory 110) of neighbor pixels for block blk (see step S104).

Below, the above representative pixel value for the object is called the "object pixel value", which is represented as "Value (i)". This "i" is an object identifier used for identifying each object, and is an integer that is greater than or equal to 0, and smaller than numObjs. In addition, the object identifier is allocated in accordance with a predetermined criterion. Here, the object identifier is sequentially allocated from the smallest to the largest of the object pixel value.

The set of the neighbor pixels (used in this step) for block blk, which is stored in the decoded image memory 110, is called the "second reference pixels". Any methods which should be common between the encoding and decoding sides can be used for selecting the second reference pixels and for determining the object pixel value based on the pixel values for the second reference pixels.

Regarding the selection of the second reference pixels, they may be set to a group of pixels having a predetermined positional relationship. Additionally, information that indicates the selection method applied to each unit (e.g., frame or a group of blocks) may be encoded so as to be communicated to the decoding side. In addition, common reference pixels between the first reference pixels and the second reference pixels may be selected, or the second reference pixels may differ from the first reference pixels.

In order to determine the object pixel value as the representative of each object, the second reference pixels may be separated into clusters, the number of which is numObjs, by means of a clustering method as described above, and an average or median for the pixel values of the pixels included in each cluster may be determined to be the relevant object pixel value.

If the first reference pixels and the second reference pixels are the same and the object number is determined by means of the clustering, the object pixel value may be determined together with the determination of the object number.

Figure 4A:
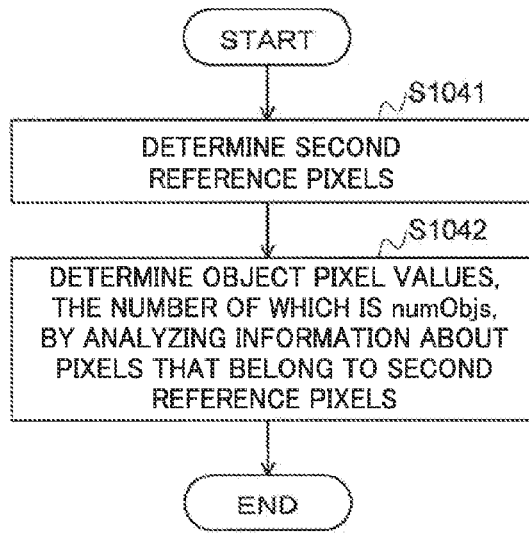
FIG. 4A is a flowchart explaining an object pixel value determination process.
Figure 4B:
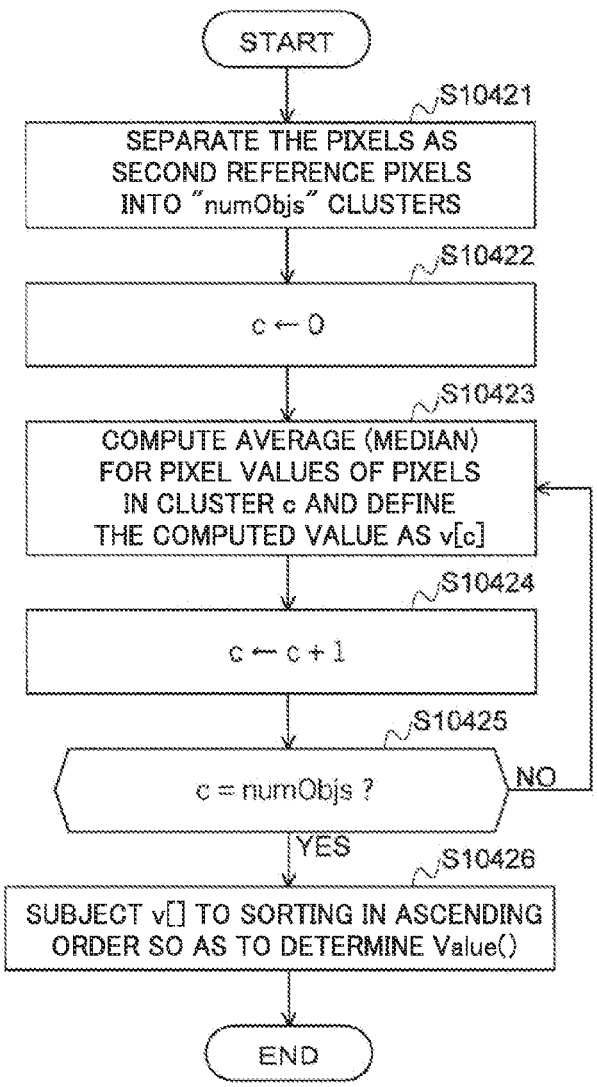
FIG. 4B is also a flowchart explaining the object pixel value determination process.

FIGS. 4A and 4B show detailed flowcharts for the process of determining the object pixel value (in step S104 in FIG. 2).

As shown in FIG. 4A, the process of determining the object pixel value first determines the second reference pixels, which are stored in the decoded image memory 110 and function as a set of neighbor pixels for block blk (see step S1041).

Next, object pixel values Value(i) (the number of which is numObjs) is determined by analyzing information (for position or pixel value) about pixels that belong to the second reference pixels (see step S1042).

FIG. 4B shows a detailed operation flow of the above step S1042.

First, the pixels of the second reference pixels are separated into clusters, the number of which is numObjs (see step S10421), where information used for the clustering may be the position and/or pixel value of each pixel.

After completing the clustering, an average or median of the pixel values of the pixels included in each cluster is computed (see steps S10422 to S10425).

After that, the computed values are subjected to sorting in a predetermined order (here, ascending order) so as to determine Value(i) (see step S10426).

In another method of determining the object pixel value, the pixels are grouped into clusters, the number of which is numObjs or smaller and is the minimum value when satisfying a condition that the maximum value of the variance for pixel values in each cluster is smaller than a specific threshold. In this case, an average or median of the pixel values in each cluster may be determined to be the object pixel value, and an arbitrary object pixel value is applied to each of objects, the number of which is the difference between numObjs and the number of clusters.

For example, when the first reference pixels differ from the second reference pixels, "numObjs" obtained using the first reference pixels may be not suitable for separating the second reference pixels. Therefore, an optimum number of clusters applied to the second reference pixels can be obtained in the above described manner, thereby setting more appropriate object pixel values.

Additionally, in a method of determining the object pixel values with a small amount of computation for a case in which numObjs is 2, an average of the pixel values of all pixels in the second reference pixels is computed, and (i) an average or median for the pixel values of the pixels (in the second reference pixels) which each have a pixel value smaller than the average, and (ii) an average or median for the pixel values of the pixels (in the second reference pixels) which each have a pixel value greater than or equal to the average may be employed as the object pixel values.

After the object pixel value is determined, an object map for block blk is generated by the object map generation unit 105 (see step S105).

Figures 5, 6A:
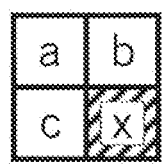
FIG. 5 is a diagram showing an example of the object map.
FIG. 6A is a diagram for explaining an example of the object identifier allocation for encoding target pixels.

The object map is obtained by assigning an object identifier to each pixel in block blk, and may be two-dimensional information as shown in FIG. 5.

In order to assign an object identifier to each pixel, an object identifier having an object pixel value closest to the pixel value of the pixel may be employed.

In another method, the pixels in the block blk are subjected to a clustering as described above, so as to determine a pixel value as a representative of each cluster, and an object identifier having an object pixel value most akin to the determined value is applied to all pixels that belong to the relevant cluster. In this process, the number of clusters may be set to numObjs, a value smaller than or equal to numObjs, or any values for obtaining optimum clusters.

In another method, a plurality of candidates for the object map are generated, and for each candidate, a rate-distortion cost is computed, which is obtained by the weighted sum of the amount of code and the amount of distortion which are evaluated for the encoding using the object map, where the object map which produces the minimum cost is employed.

All possible object maps may be set as such candidates, or only a limited number thereof may be set as the candidates.

Distinctive object maps may include an object map generated by assigning to each pixel, an object identifier that has an object pixel value closest to the pixel value of the pixel; an object map, all pixels of which have the same object identifier; and an object identifier that is horizontally or vertically divided into two sections.

Next, the generated object map is encoded by the object map encoding unit 106 (see step S106).

The encoding may be performed by any method. For example, a fixed or variable length code is assigned to each object identifier according to the object number, and the two-dimensional map information is converted into one-dimensional binary data by means of raster or zigzag scanning, so as to perform the encoding.

In another method of encoding the object identifier assigned to each pixel in block blk while scanning the pixels in a predetermined order, previously-encoded pixels around each pixel are determined to be third reference pixels, and arithmetic encoding is performed while switching a probability table in accordance with the object identifiers of the third reference pixels.

If the pixels to be employed as the third reference pixels are determined based on a positional relationship with respect to the pixels to be encoded, pixels at target positions may be outside of the relevant picture or may have been subjected to predictive encoding which uses no object map, e.g. intra prediction of H.264.

As for such pixels, predetermined object identifiers may be assigned thereto or another probability table may be defined by assigning "unknown" labels to them.

Figure 6B:
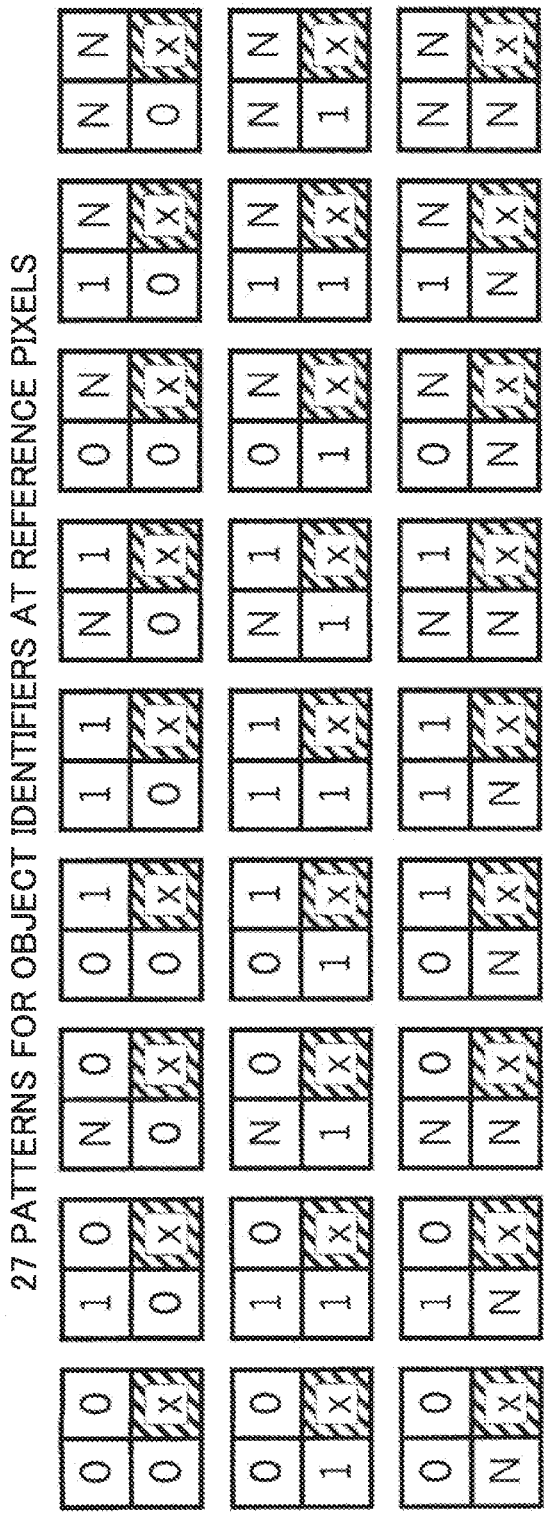
FIG. 6B is also a diagram for explaining an example of the object identifier allocation for encoding target pixels.

For example, when the object number is 2, three reference pixels a, b, and c are defined as the third reference pixels for the encoding target pixel (see "x" in FIG. 6A). If "unknown" labels (see "N" in FIG. 6B) are also used, totally 27 probability tables are used for performing the encoding, as shown in FIG. 6B.

Although the same probability tables must be used on the decoding side, they may be fixed or variable. If they are variable, the probability table may be updated according to an encoding history.

Generally, a single object appears continuously. Therefore, it is possible to more accurately represent occurrence probability of an encoding target symbol by using peripheral circumstances (detected using neighbor pixels) as shown above, and thus to improve the encoding efficiency for arithmetic coding.

Although the third reference pixels are set to three neighbor pixels in the above example, it is possible to further accurately predict the occurrence probability by using information about more neighbor pixels.

In another method, the object map is converted into tree-structure information prior to the encoding. In a specific tree structure, block blk corresponds to a root, and a plurality of sub-blocks, which are obtained by dividing the block of the parent node (i.e., root), are assigned to each child node. According to such a tree structure, it is possible to efficiently represent a set of pixels (which are present together) of a single object, thereby improving the encoding efficiency.

Any tree structure may be defined.

For example, binary information that indicates whether or not the object identifiers of all pixels in a block corresponding to each node are the same is applied to the node. As each child node, (i) if the above object identifiers are the same, a leaf having the number of the relevant object identifier is defined, or (ii) if the above object identifiers are not the same, the relevant block is divided into four sub-blocks and four nodes corresponding thereto are defined. Accordingly, tree-structure information can be generated.

When a target block has only one pixel, the node that indicates whether or not the object identifiers of all pixels are the same can be omitted.

Figure 7:
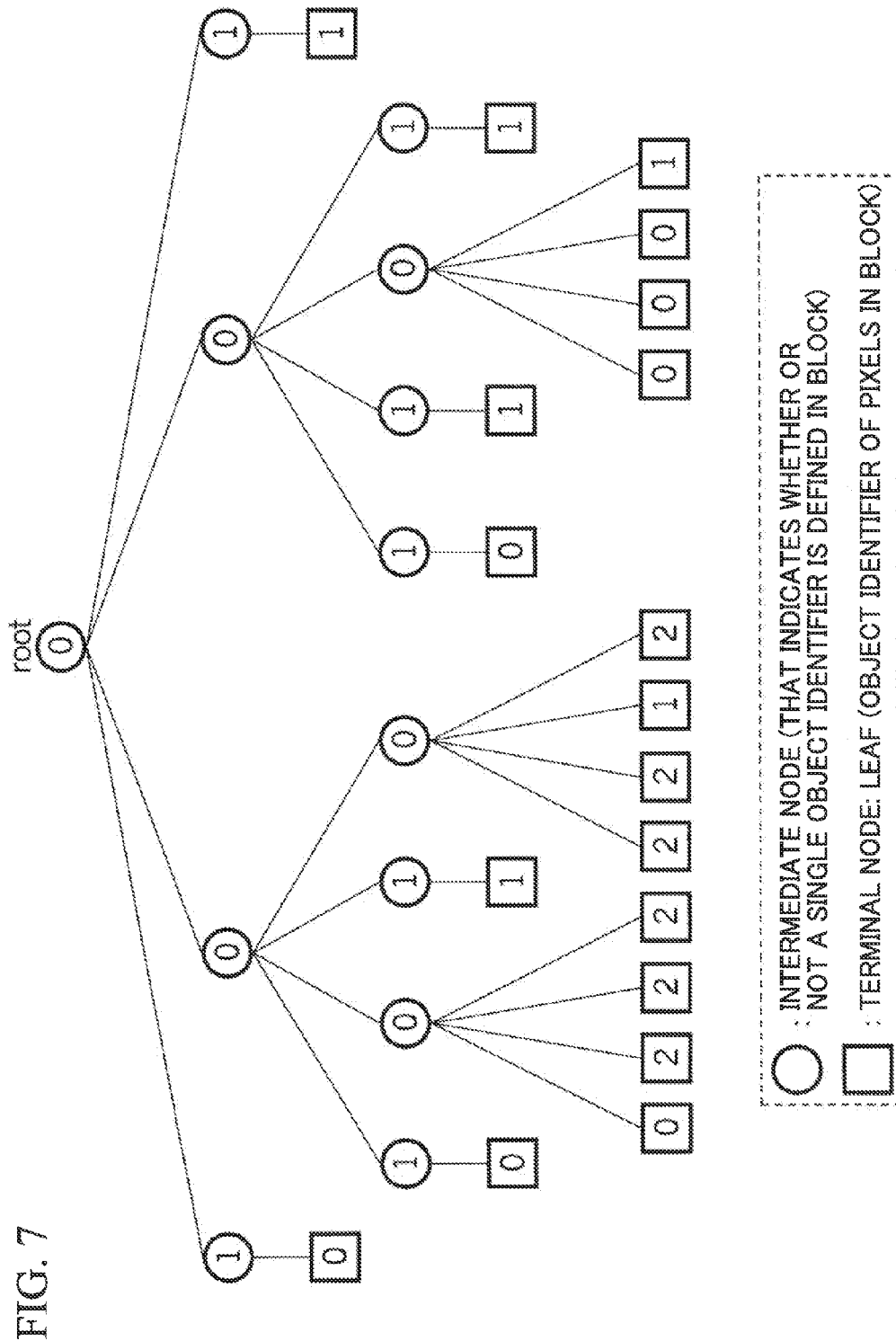
FIG. 7 is a diagram showing an example of the tree-structure object map.

FIG. 7 shows a tree structure generated for the object map of FIG. 5 by using the above-described method.

In FIG. 7, to each node, binary information "1" is applied if the object identifiers of all pixels in the block corresponding to the node are the same; otherwise binary information "0" is applied.

In another definition, to each node, if the object identifiers of all pixels in the block corresponding to the node are the same, a number obtained by adding 1 to the relevant object identifier is applied; otherwise binary information "0" is applied, where for only nodes to which 0 is applied, child nodes corresponding to four sub-blocks obtained by dividing the relevant block are defined.

Figure 8:
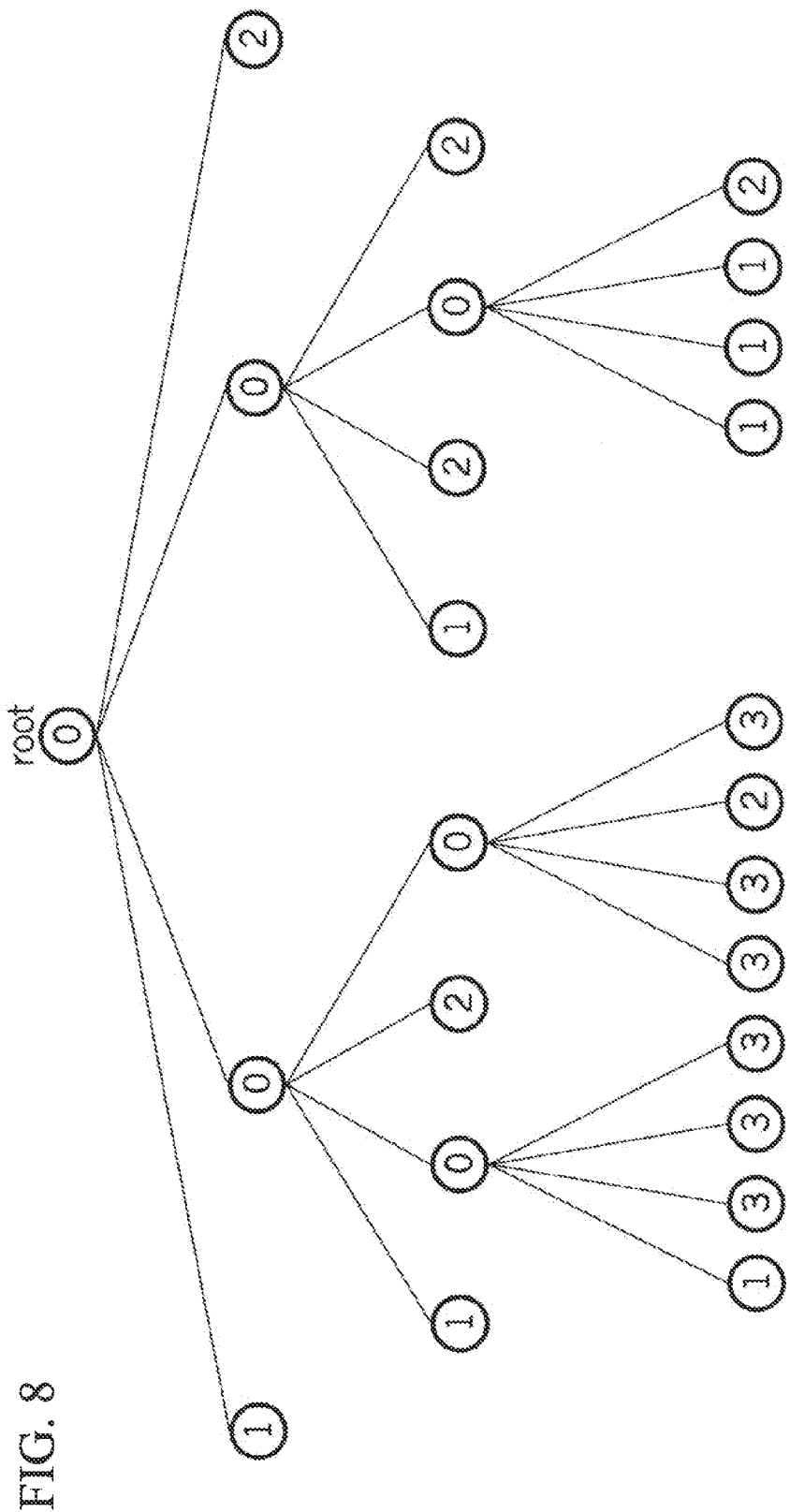
FIG. 8 is a diagram showing another example of the tree-structure object map.

FIG. 8 shows a tree structure generated for the object map in FIG. 5 by using the above method.

In the encoding of the generated tree, the tree is scanned using depth-first search or width-first search, and information about each node is encoded in the scanning order.

The depth-first search is a search that starts from the root node of the tree (i.e., target for search), extends deeply until a target node or a nod having no child is found, and then returns to a node (nearest to the node at the end of the current search) that has not yet been subjected to the search.

In contrast, the width-first search has a rule such as "in order of depth from the smallest (i.e., from a point to which a small number of nodes to be visited from the top are present)" or "in sequential order from the node on the left side".

Additionally, it is possible to separately encode leaf nodes and the other nodes.

A numerical sequence obtained by scanning the tree in FIG. 7 by means of the depth-first search is "01001000222110221201011000011111".

When separating the leaf nodes from the other nodes, the leaf nodes produce "00022212212010001111", and the other nodes produce "0101010011011".

In addition, a numerical sequence obtained by scanning the tree in FIG. 8 by means of the depth-first search is "01010133320332301201111222".

Such a numerical sequence may be directly binarized to generate encoded data, or may be subjected to arithmetic encoding while switching the probability table in accordance with the state of object identifiers of neighbor pixels.

For example, in order to encode nodes other than the leaf nodes of FIG. 7, the object identifiers of pixels adjacent to a block corresponding to each node may be examined, and the probability table may be switched in accordance with the number of pixels corresponding to an object identifier that has the maximum number of pixels.

In order to encode the leaf nodes of FIG. 7, the probability table may be switched in accordance with the state of identifiers of pixels adjacent to a block corresponding to each node.

Although the same probability table must be used by the encoding and the decoding sides, they may be fixed or variable. If they are variable, the probability table may be updated according to an encoding history.

After the encoding of the object map is completed, a predicted image for block blk is generated by the predicted image generation unit 107 by using the object map and each object pixel value (see step S107).

More specifically, the predicted image is generated by assigning to each pixel, an object pixel value that corresponds to the corresponding object identifier obtained by the object map.

The above-generated predicted image may be subjected to dithering.

A predicted image, which is generated using the object map and each object pixel value, has only pixel values the number of which coincides with the object number. Therefore, the predicted image may have characteristics which differ from natural images. Because of dithering (that combines existing pixel values so as to represent intermediate pixel values in the entire image), a variation that more approximates a natural image can be applied to the predicted image.

Although any method for performing dithering can be used, the same dithering effect should be produced on the decoding side. Therefore, if additional information is required for such production, the additional information should be encoded.

After obtaining the predicted image, an image signal for block blk is subjected to predictive encoding executed by the image signal encoding unit 108 (see step S108).

The encoding may be performed using any method. In generally known encoding such as MPEG-2 or H.264/AVC, a differential signal between the image signal and the predicted image of block blk is sequentially subjected to frequency transformation such as DCT, quantization, binarization, and entropy encoding.

Next, the image signal decoding unit 109 decodes the image signal for block blk by using encoded data (i.e., result of the encoding) and the predicted image, and stores the decoded result in the decoded image memory 110 (see step S109). Here, the encoded data is decoded using a method corresponding to that used in the encoding. For example, for generally known encoding such as MPEG-2 or H.264/AVC, the encoded data is sequentially subjected to entropy decoding, inverse binarization, inverse quantization, and inverse transformation such as IDCT. The obtained two-dimensional signal is added to the predicted signal, and the added result is finally subjected to clipping within a range of the pixel values, thereby decoding the image signal.

The image signal obtained by decoding is used for generating or predicting the object number or each object pixel value when encoding another block.

In the last step, the multiplexing unit 111 multiplexes encoded data of the object map and encoded data of the image signal, and outputs the multiplexed data (see step S110).

Although the multiplexing is performed for each block, it may be performed for each frame. In this case, decoding on the decoding side should be executed after buffering one frame of encoded data.

In the first embodiment, although both the object number and the object pixel value are determined by analyzing the pixel values of neighbor pixels for block blk, only one of them may be determined by analyzing the pixel values of neighbor pixels for block blk.

In that case, information that has not been determined is determined by analyzing the pixel values of block blk while information that has been determined is encoded. The obtained encoded data is multiplexed together with the encoded data of the object map and the encoded data of the image signal, and the multiplexed data is outputs.

Figure 9:
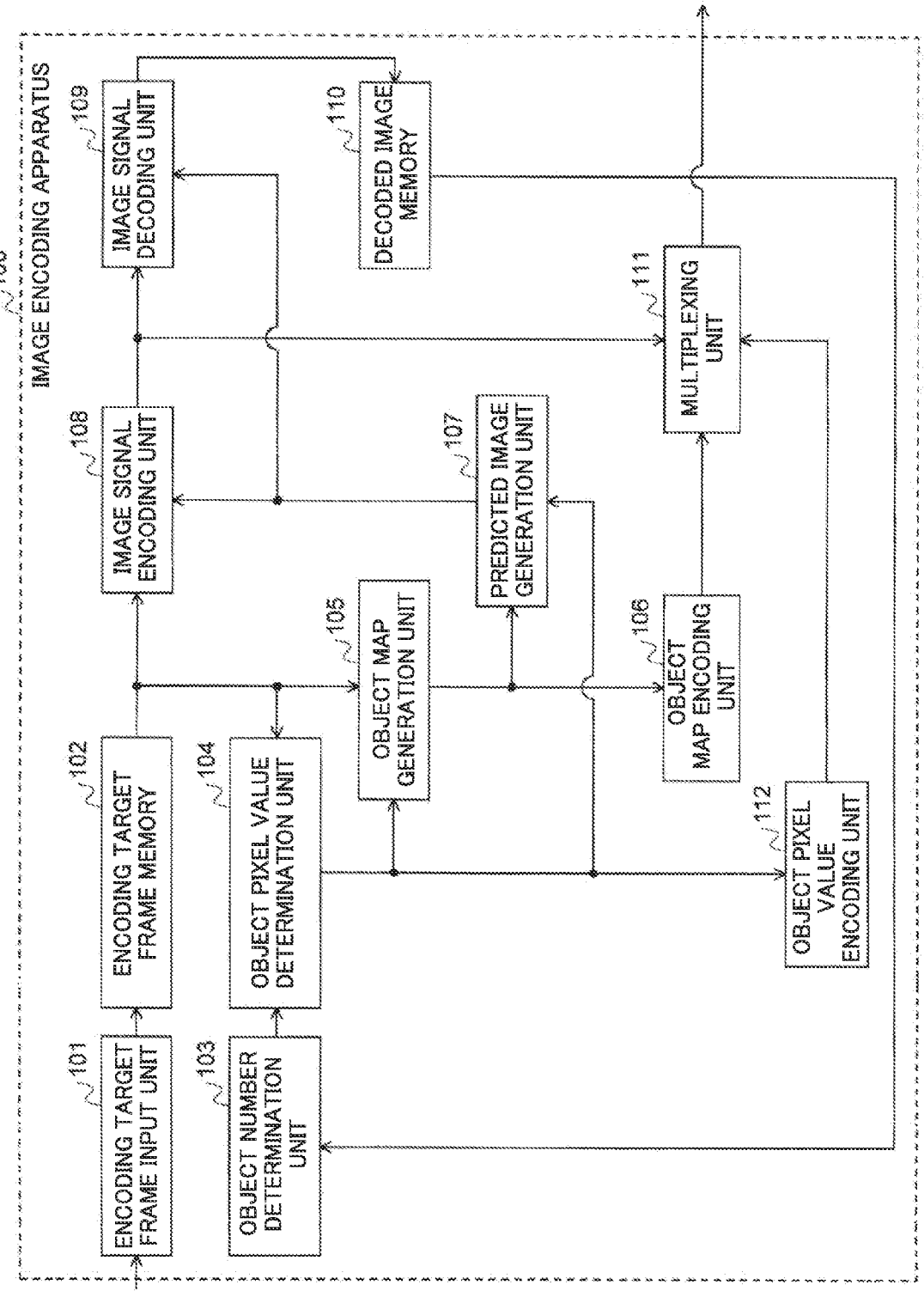
FIG. 9 is a flowchart explaining the operation of the image encoding apparatus in the first embodiment.

FIG. 9 is a block diagram for the image encoding apparatus employed when analyzing the pixel values of neighbor pixels for block blk so as to determine only the object number, and encoding the object pixel value.

In comparison with the image encoding apparatus 100 in FIG. 1, an image encoding apparatus 100' in FIG. 9 has a distinctive feature of having an object pixel value encoding unit 112 that encodes the object pixel value of each object, which is determined by the object pixel value determination unit 104, where encoded data of the object pixel value encoded by the object pixel value encoding unit 112 is multiplexed as additional information by the multiplexing unit 111. The other structural elements are identical to those of the image encoding apparatus 100 in FIG. 1.

Second Embodiment

Image Encoding Apparatus

Next, a second embodiment of the present invention will be explained.

Figure 10:
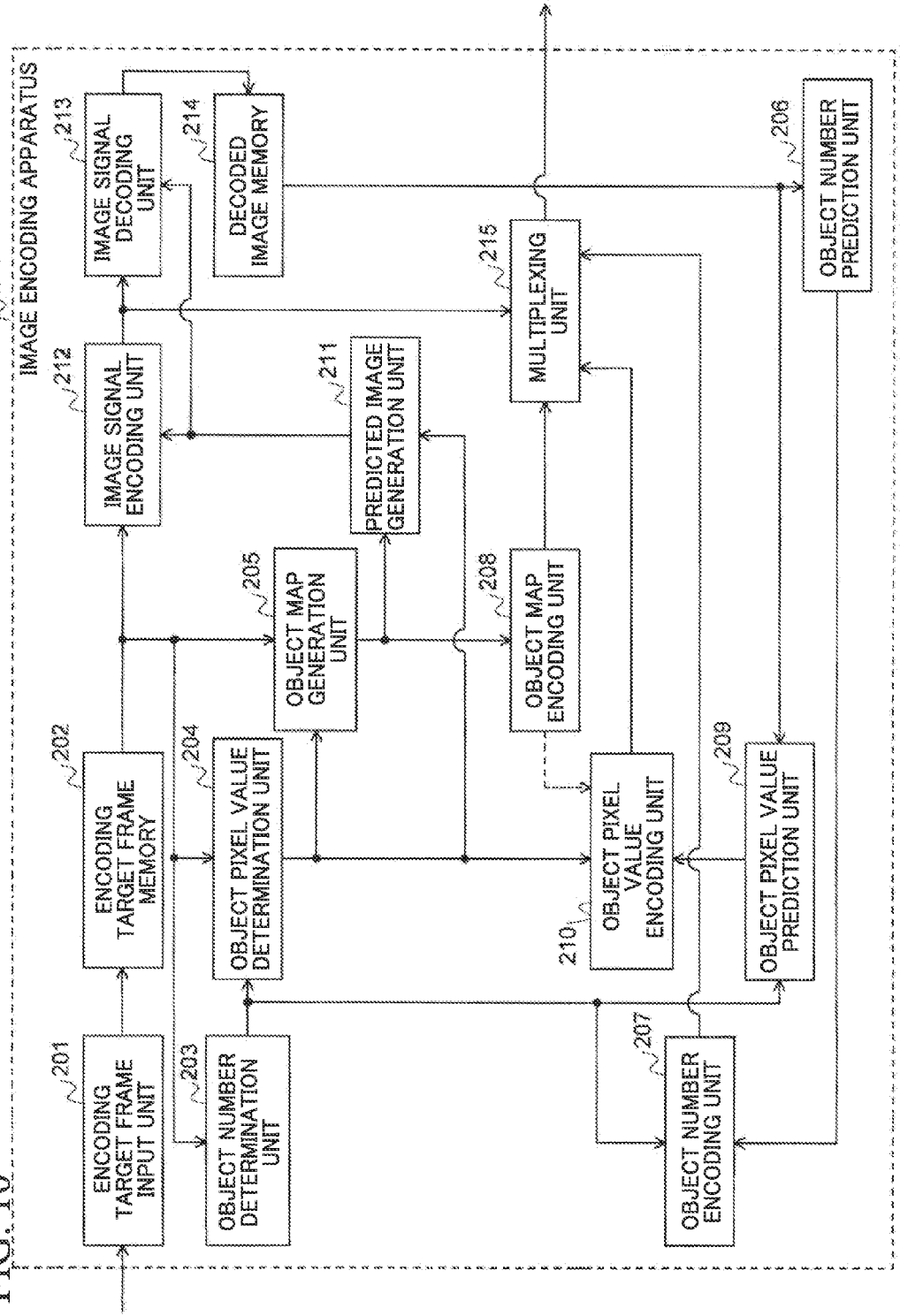
FIG. 10 is a block diagram showing the structure of an image encoding apparatus as the second embodiment of the present invention.

FIG. 10 is a block diagram showing the structure of an image encoding apparatus as the second embodiment of the present invention.

As shown in FIG. 10, an image encoding apparatus 200 has an encoding target frame input unit 201, an encoding target frame memory 202, an object number determination unit 203, an object pixel value determination unit 204, an object map generation unit 205, an object number prediction unit 206, an object number encoding unit 207, an object map encoding unit 208, an object pixel value prediction unit 209, an object pixel value encoding unit 210, a predicted image generation unit 211, an image signal encoding unit 212, an image signal decoding unit 213, a decoded image memory 214, and a multiplexing unit 215.

The encoding target frame input unit 201 receives an image frame as an encoding target.

The encoding target frame memory 202 stores the received encoding target frame.

The object number determination unit 203 determines the object number for objects included in a processing region having a predetermined size.

The object pixel value determination unit 204 assumes that a specified number of objects are present in the processing region, and determines a pixel value as a representative of each object, by using pixel values of the received frame for the processing region. The pixel value as the representative of each object (i.e., the pixel value generated for each object in the processing region) is called the object pixel value.

The object map generation unit 205 generates an object map for identifying the object obtained at each pixel in the processing region.

The object number prediction unit 206 determines a predicted value for the number of objects in the processing region. This predicted value for the object number is called a "predicted object number".

The object number encoding unit 207 encodes the object number by using the predicted object number.

The object map encoding unit 208 encodes the object map.

The object pixel value prediction unit 209 assumes that a specified number of objects are present in the processing region, and determines a predicted value for each object pixel value by using a decoded image of a neighbor region for the processing region. This predicted value for the object pixel value is called a "predicted object pixel value".

The object pixel value encoding unit 210 encodes the object pixel value by using the predicted object pixel value.

The predicted image generation unit 211 generates a predicted image for the processing region, based on each object pixel value and the object map which were generated for the processing region.

The image signal encoding unit 212 encodes, for each processing region, an image signal of the encoding target frame by using the predicted image.

The image signal decoding unit 213 decodes, for each processing region, encoded data of the image signal of the encoding target frame by using the predicted image.

The decoded image memory 214 stores the decoded image signal.

The multiplexing unit 215 multiplexes encoded data of the object number, encoded data of the object map, encoded data of the object pixel value, and encoded data of the image signal of the encoding target frame, and outputs the multiplexed data.

Figure 11:
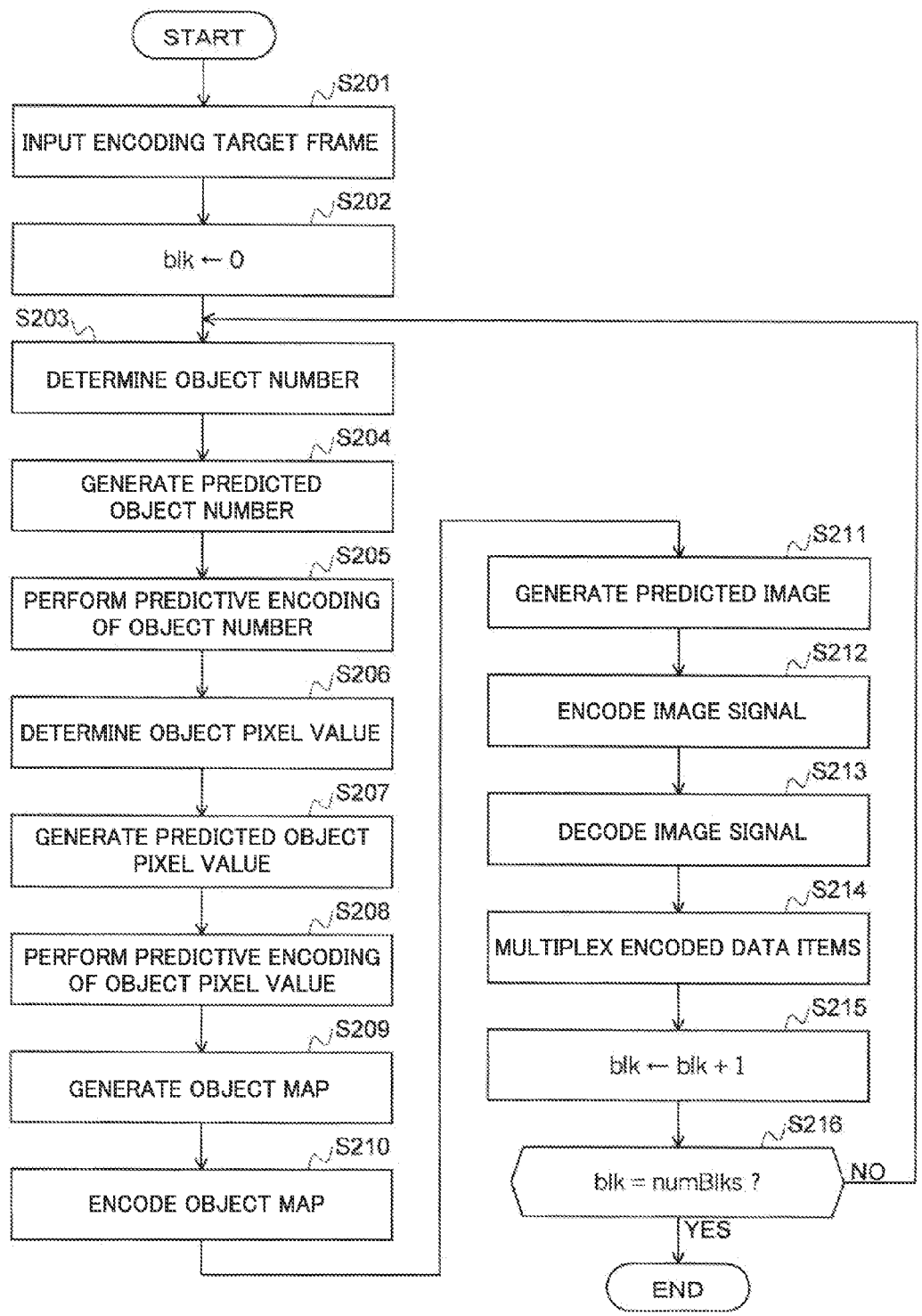
FIG. 11 is a flowchart explaining the operation of the image encoding apparatus in the second embodiment.

FIG. 11 is a flowchart explaining the operation of the image encoding apparatus 200 in the second embodiment. According to the flowchart, the operation executed by the image encoding apparatus 200 will be explained in detail.

First, the encoding target frame input unit 201 receives an encoding target frame, which is stored in the encoding target frame memory 202 (see step S201).

After completing the storage of the encoding target frame, it is divided into regions, and the image signal of the encoding target frame is encoded for each divided region (see steps S202 to S216).

More specifically, given "blk" for an encoding target block index and "numBlks" for the total number of encoding target blocks, blk is initialized to be 0 (see step S202), and then the following process (from step S203 to step S214) is iterated while adding 1 to blk (see step S215) until blk reaches numBlks (see step S216).

In the process iterated for each encoding target block, first, the object number determination unit 203 determines the number of objects ("numObjs") included in block blk (see step S203). Any methods can be used for determining the object number.

For example, the object number is determined in accordance with pixel values of the encoding target block.

More specifically, the pixels of the encoding target block may be subjected to clustering using, for example, a K-means method or Affinity Propagation, so that the minimum number of clusters, in each of which the variance for the pixel values is smaller than or equal to a predetermined value, is determined to be the object number. The criterion for the clustering may be only the pixel value, or may be both the pixel value and the pixel position.

In another method, for each candidate of the object number, a rate-distortion cost is computed, which is obtained by the weighted sum of the amount of code and the amount of distortion which are evaluated for the encoding using the object number, where the object number which produces the minimum cost is employed.

Since the encoding efficiency may be degraded according to an increase in the object number, the maximum number thereof may be predetermined so as to prevent the object number from being larger than a value.

After completing the determination of the object number, the object number prediction unit 206 generates the predicted object number of block blk by using image signals of neighbor pixels for block blk, which are stored in the decoded image memory 214 (see step S204).

The set of the neighbor pixels for block blk, which are used as shown above and stored in the decoded image memory 214 is called "first reference pixels".

The above process is identical to the object number determining process in step S103 of the first embodiment except that the determined value is the predicted object number. Any methods which should be common between the encoding and decoding sides can be used for determining the first reference pixels and for determining the predicted object number based on the pixel values for the first reference pixels.

After determining the predicted object number, the object number encoding unit 207 subjects the object number to predictive encoding by using the predicted object number (see step S205), that is, it encodes a difference value between the object number and the predicted object number.

The encoding may be performed by any method. For example, a code table is prepared so as to perform the encoding by outputting a code word corresponding to the difference value.

Generally, each object has a certain size and spatially continuous. Therefore, the object number in a region has a high degree of correlation with respect to the object number in a neighbor region. Accordingly, when the object number in a certain region is encoded by defining the object number in a neighbor region therefor as a predicted value, the object number can be encoded with a smaller amount of code.

In addition, if a code table as described above is prepared, efficient encoding by using correlation can be performed by assigning shorter code to the numbers around 0.

Next, the object pixel value determination unit 204 determines a pixel value that represents each object in block blk (see step S206).

Below, the above representative pixel value for the object is called the "object pixel value", which is represented as "Value (i)". This "i" is an object identifier used for identifying each object, and is an integer that is greater than or equal to 0, and is smaller than numObjs. In addition, the object identifier is allocated in accordance with a predetermined criterion. Here, the object identifier is sequentially allocated from the smallest to the largest of the object pixel values.

In order to assign one pixel value to each object, any method can be used. For example, pixels of block blk are grouped into clusters, the number of which is numObjs by means of clustering as described above, and an average or median of the pixel values of pixels included in each cluster may be determined to be the object pixel value.

If the pixels of block blk are subjected to clustering, the object number may be determined simultaneously with the determination of the object pixel value.

After obtaining each object pixel value, the object pixel value prediction unit 209 generates predicted object pixel values, the number of which is numObjs, by using image signals of neighbor pixels for block blk, which are stored in the decoded image memory 214 (see step S207).

Below, the predicted object pixel values are denoted as PredValue(j), where index (value) j is applied to each predicted object pixel value in accordance with the same rule as that applied to the allocation of each object identifier to the corresponding object pixel value. That is, when the object identifier is allocated in order from the smallest to the largest object pixel value, the above index j is allocated in order from the smallest to the largest predicted object pixel value The set of the neighbor pixels (used in this step) for block blk, which is stored in the decoded image memory 214, is called the "second reference pixels". The above process is identical to the object pixel value determining process in step S104 of the first embodiment except that the determined value is the predicted object pixel value. Any methods which should be common between the encoding and decoding sides can be used for determining the second reference pixels and for determining the predicted object pixel value based on the pixel values of the second reference pixels.

After determining the predicted object pixel value, the object pixel value encoding unit 210 subjects the object pixel value to predictive encoding by using the predicted object pixel value (see step S208).

Any method can be used for the encoding. For example, when encoding an object pixel value corresponding to an object identifier, a difference value between this object pixel value and a predicted object pixel value which have the same index value is encoded with reference to a code table.

In addition, instead of directly encoding the difference value, a value as a result of quantization using a quantization parameter (which is supplied separately) may be encoded. In this case, the quantization parameter should be encoded. However, if a quantization parameter used in another process is also used in the current process, it is unnecessary to encode the quantization parameter again for the current process.

In another method, predictive encoding may be performed using, not only the predicted object pixel value, but also a previously-encoded object pixel value in block blk. This process will be explained below in an example in which the encoding is performed in order from the smallest to the largest object pixel value, where the object identifier i and the index j are each applied in order from the smallest to the largest object pixel value or predicted object pixel value.

First, the object pixel value for the object identifier "0" is subjected to predictive encoding in which the predicted value is a predicted object pixel value having an index value "0". That is, a value obtained by "Value(0)—PredValue(0)" is encoded.

Next, the encoded data is decoded to have a decoded object pixel value DecValue(0). If a lossy encoding is performed (e.g., encoding the prediction residual after quantization as described above), DecValue may not coincide with Value. However, when a lossless encoding is performed, DecValue completely coincides with Value, so that no decoding process is necessary.

Next, the object pixel value having object identifier "k" is encoded in order from the smallest to the largest value of k, where k is an integer greater than or equal to 1, and smaller than numObjs.

In the encoding of the object pixel value having object identifier k, the first step obtains an index value of the minimum predicted object pixel value which satisfies that difference between this pixel value and DecValue(k−1) is greater than or equal to a predetermined threshold. The obtained index value is denoted by j(k). If it is assumed that j(0)=0, the obtained j(k) is an integer greater than or equal to j(k−1), and smaller than numObjs, where k is an integer greater than or equal to 1, and smaller than numObjs.

After obtaining j(k), Value(k) is subjected to predictive encoding whose predicted value is PredValue(j(k)).

If no j(k) has been obtained, Value(k) is subjected to predictive encoding whose predicted value is a larger value between DecValue(k−1) and PredValue(numObjs−1). In this process, an integer closest to a median between (i) a larger value between DecValue(k−1) and PredValue(numObjs−1) and (ii) the maximum pixel value (255 if the pixel value is represented in 8 bits) may be defined as the predicted value.

The relevant encoded data is decoded before encoding the next object pixel value, and DecValue(k) is computed.

Generally, each object has a certain size and is spatially continuous. Since the pixel value considerably depends on the object, the object pixel value in a region has a high degree of correlation with respect to the object pixel value in a neighbor region. Accordingly, when the object pixel value in a certain region is encoded by defining the object pixel value in a neighbor region therefor as a predicted value, the object pixel value can be encoded with a smaller amount of code.

After completing the encoding of the object pixel value, an object map for block blk is generated by the object map generation unit 205 (see step S209). This step is identical to step S105 in the first embodiment.

If a lossy encoding is applied to the encoding of the object pixel value (e.g., the encoding with quantization), then instead of the object pixel value, a decoded object pixel value obtained by decoding the encoded object pixel value is used.

More specifically, if employing a lossy encoding for the encoding of the object pixel value, a signal output from the object pixel value encoding unit is supplied to an object pixel value decoding unit or the like (provided separately), and a signal output therefrom is supplied to the object map generation unit and the predicted image generation unit explained later.

The generated object map is encoded by the object map encoding unit 208 (see step S210). This step is identical to step S106 in the first embodiment, and any method can be used for the relevant encoding.

Next, a predicted image for block blk is generated by the predicted image generation unit 211 by using the object map and each object pixel value (see step S211). This step is identical to step S107 in the first embodiment.

If a lossy encoding is applied to the encoding of the object pixel value (e.g., the encoding with quantization), then instead of the object pixel value, a decoded object pixel value obtained by decoding the encoded object pixel value is used.

After obtaining the predicted image, an image signal for block blk is subjected to predictive encoding executed by the image signal encoding unit 212 (see step S212).

This step is identical to step S108 in the first embodiment, and any method can be used for the relevant encoding.

Next, the image signal decoding unit 213 decodes the image signal for block blk by using encoded data (i.e., result of the encoding) and the predicted image, and stores the decoded result in the decoded image memory 214 (see step S213).

The image signal obtained by decoding is used for generating or predicting the object number or each object pixel value when encoding another block. This step is identical to step S109 in the first embodiment, and the encoded data is decoded using a method corresponding to that employed in the encoding.

In the last step, the multiplexing unit 215 multiplexes encoded data of the object number, encoded data of the object pixel value, encoded data of the object map, and encoded data of the image signal, and outputs the multiplexed data (see step S214).

Although the multiplexing is performed for each block, it may be performed for each frame. In this case, decoding on the decoding side should be executed after buffering one frame of encoded data.

In the second embodiment, the object pixel value is encoded before the object map is generated. However, if all object identifiers are not present in the object map, the object pixel value may be encoded after generating the object map, or the object pixel value may be re-encoded when the object map is generated, thereby further reducing the amount of generated code.

That is, the encoded data can include only the object pixel value corresponding to each object identifier which appears in the object map, so as to reduce the amount of code required for each unnecessary object pixel value for decoding.

If the object pixel value has been encoded by a lossy encoding, control for obtaining an identical decoded object pixel value between before and after the re-encoding may be performed, or the object map may be re-generated using a result of the re-encoding.

In the second embodiment, although the pixel values of neighbor pixels for block blk are analyzed for both the object number and the object pixel value so as to determine the predicted object number and the predicted object pixel value and perform the predictive encoding, only one of the object number and the object pixel value may be subjected to the predictive encoding. In this case, information that has not been subjected to the predictive encoding may be generated as information which requires no encoding (as in the first embodiment), or may be directly encoded without generating a predicted value.

Third Embodiment

Image Decoding Apparatus

Next, a third embodiment of the present invention will be explained.

Figure 12:
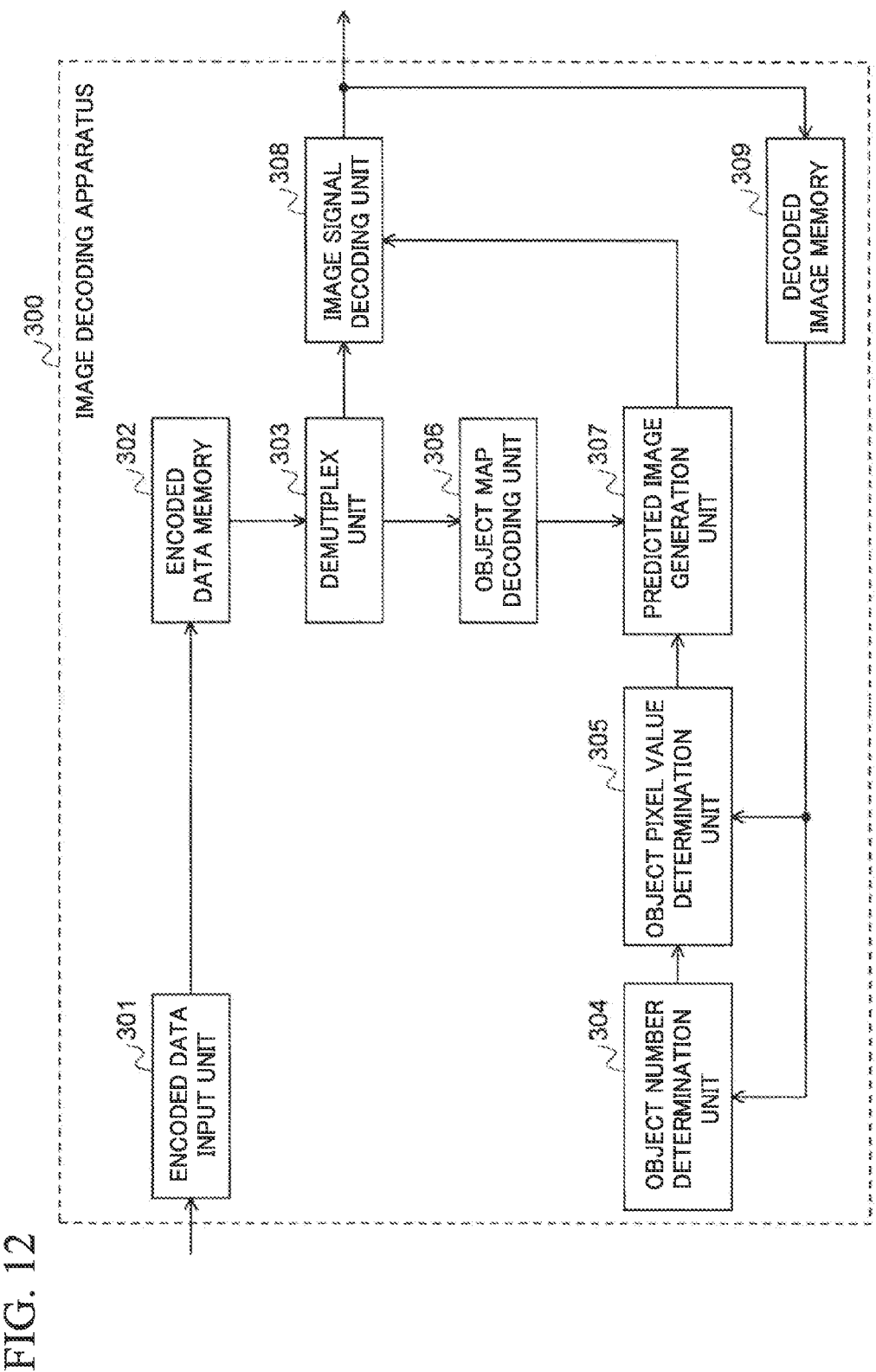
FIG. 12 is a block diagram showing the structure of an image decoding apparatus as the third embodiment.

FIG. 12 is a block diagram showing the structure of an image decoding apparatus as the third embodiment of the present invention.

As shown in FIG. 12, an image decoding apparatus 300 has an encoded data input unit 301, an encoded data memory 302, a demultiplex unit 303, an object number determination unit 304, an object pixel value determination unit 305, an object map decoding unit 306, a predicted image generation unit 307, an image signal decoding unit 308, and a decoded image memory 309.

The encoded data input unit 301 receives encoded data of an image frame as the decoding target.

The encoded data memory 302 stores the received encoded data.

The demultiplex unit 303 separates multiplexed encoded data into a plurality of encoded data items having different information items.

The object number determination unit 304 determines the object number for objects included in a processing region having a predetermined size.

The object pixel value determination unit 305 assumes that a specified number of objects are present in the processing region, and determines a pixel value as a representative of each object, by using a decoded image adjacent to the processing region. The pixel value as the representative of each object (i.e., the pixel value generated for each object in the processing region) is called the object pixel value.

The object map decoding unit 306 decodes an object map from the encoded data. The object map is information used for identifying an object obtained at each pixel in the processing region.

The predicted image generation unit 307 generates a predicted image for the processing region, based on each object pixel value and the object map for the processing region.

The image signal decoding unit 308 decodes the image signal of the decoding target frame from the encoded data, by using the predicted image for each processing region.

The decoded image memory 309 stores the decoded image signal.

Figure 13:
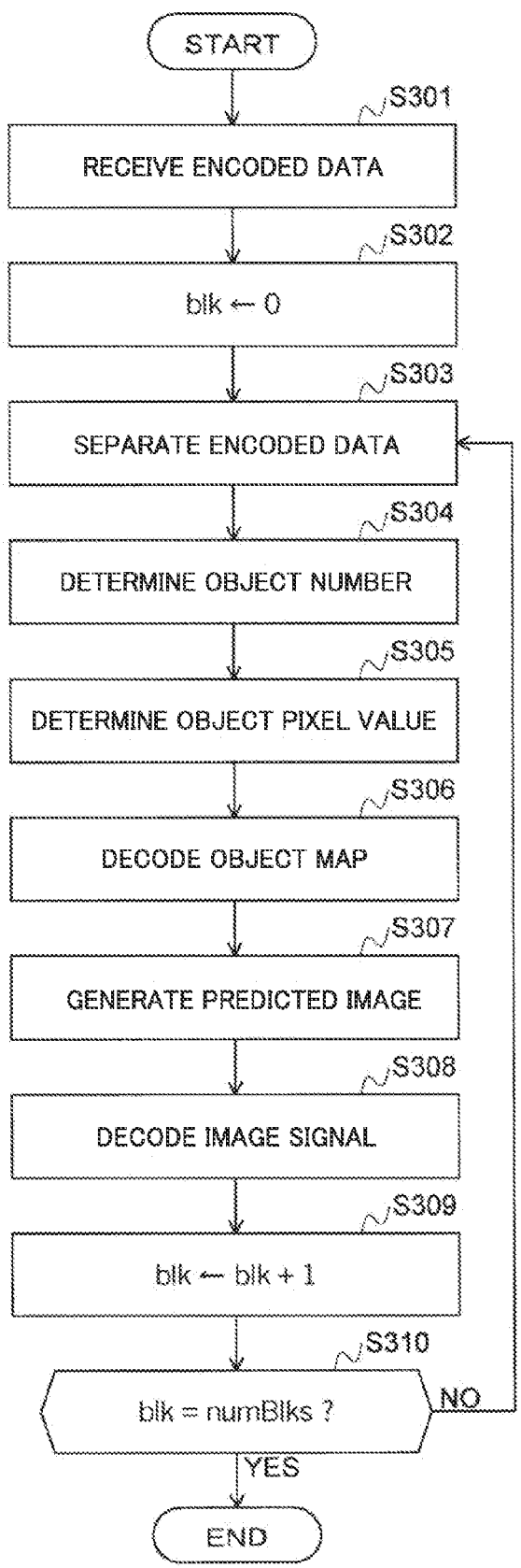
FIG. 13 is a flowchart explaining the operation of the image decoding apparatus in the third embodiment.

FIG. 13 is a flowchart explaining the operation of the image decoding apparatus 300 in the third embodiment. According to the flowchart, the operation executed by the image decoding apparatus 300 will be explained in detail.

First, the encoded data input unit 301 receives encoded data of the decoding target frame, and stores it into the encoded data memory 302 (see step S301).

After completing the storage of the encoded data, the decoding target frame is divided into regions, and the image signal of the decoding target frame is decoded for each divided area (see steps S302 to S310).

More specifically, given "blk" for a decoding target block index and "numBlks" for the total number of decoding target blocks, blk is initialized to be 0 (see step S302), and then the following process (from step S303 to step S308) is iterated while adding 1 to blk (see step S309) until blk reaches numBlks (see step S310).

In the process iterated for each decoding target block, first, the demultiplex unit 303 separates the received encoded data into encoded data items corresponding to a plurality of information items (see step S303).

In the third embodiment, encoded data items of the information items are interleaved for each block, that is, they are sequentially stored for each block. If such interleaving is performed for another processing unit such as a frame, it is unnecessary to repeat the above separation of encoded data for each block.

Next, the object number determination unit 304 determines the number of objects (object number "numObjs") included in block blk, by using image signals of neighbor pixels for block blk, that are stored in the decoded image memory 309 (see step S304).

The set of the neighbor pixels for block blk, which is stored in the decoded image memory 309, is called the first reference pixels. The process in this step is identical to that in step S103 of the first embodiment, and any methods which should be common between the encoding and decoding sides can be used for selecting the first reference pixels and for determining the object number numObjs based on the pixel values for the first reference pixels.

Regarding the selection of the first reference pixels, they may be set to a group of pixels having a predetermined positional relationship. Additionally, information that indicates the selection method applied to each unit (e.g., frame or a group of blocks) may be encoded so as to be input into the image decoding apparatus 300 together with other encoded data items. In such a case, it is necessary to decode, at an appropriate timing, the information that indicates the selection method applied to each unit (e.g., frame or a group of blocks), from part of the encoded data, which has been separated by the demultiplex unit 303. The decoded result must be communicated to the object number determination unit 304.

After completing the determination of the object number, the object pixel value determination unit 305 determines an pixel value that represents each object in block blk, by using image signals of neighbor pixels for block blk, that are stored in the decoded image memory 309 (see step S305).

Below, the above representative pixel value for the object is called the "object pixel value", which is represented as "Value (i)". This "i" is an object identifier used for identifying each object, and is an integer that is greater than or equal to 0, and smaller than numObjs. In addition, the object identifier is allocated in accordance with a predetermined criterion. Here, the object identifier is sequentially allocated from the smallest to the largest object pixel value.

The set of the neighbor pixels (used in this step) for block blk, which is stored in the decoded image memory 309, is called the "second reference pixels". The process in this step is identical to that in step S104 of the first embodiment, and any methods which should be common between the encoding and decoding sides can be used for selecting the second reference pixels and for determining the object pixel value based on the pixel values for the second reference pixels.

Next, the object map decoding unit 306 decodes the object map from the demultiplexed encoded data (see step S306). The method of decoding the object map depends on a corresponding method employed in the encoding.

For example, a fixed or variable length code may be assigned to each object identifier according to the object number, and encoding may be performed by converting the two-dimensional map information into one-dimensional binary data by means of raster or zigzag scanning.

In this case, one-dimensional binary data as the encoded data is scanned sequentially, wherein every time a relevant object identifier is found, the object identifier is assigned to the target pixel in the same order (e.g., raster or zigzag scanning) as that employed by the encoding side, so as to perform the decoding.

In another method of encoding the object identifier assigned to each pixel in block blk while scanning the pixels in a predetermined order, previously-encoded pixels around each pixel are determined to be reference pixels, and arithmetic encoding is performed while switching a probability table in accordance with the object identifiers of the reference pixels.

In this case, for each pixel that appears in a scanning order similar to that employed in the encoding, previously-decoded neighbor pixels are determined to be reference pixels, and arithmetic decoding is performed while switching a probability table in accordance with the object identifiers of the reference pixels.

For the number of probability tables, the initial value of each table, and updating and setting methods of each table, the same methods as those employed in the encoding are used so as to perform accurate decoding.

In another method, the object map may have been encoded using data of a tree structure (i.e., tree-structure data). Also in this case, the object map can be decoded from the encoded data, by using a method corresponding to the encoding method.

In an operation of decoding the object map from the provided encoded data by means of the tree-structure data, first, a numerical sequence that represents the tree-structure data is decoded from a binary sequence in the encoded data, by using a method that should correspond to a method employed on the encoding side.

For example, if arithmetic encoding using a variable probability table was performed, an uncompressed binary sequence is decoded from the encoded data while updating the probability table by using the same method as that employed in the encoding. Such an uncompressed binary sequence is subjected to inverse conversion by referring to a fixed or variable length table that is the same as the table used in the encoding, thereby decoding a numerical sequence before the encoding.

After the numerical sequence that represents the tree-structure data is decoded, the numerical sequence is interpreted so as to form the relevant data having a tree structure, where inverse conversion with respect to the conversion for generating a numerical sequence from the tree structure in the encoding should be performed.

Figure 14:
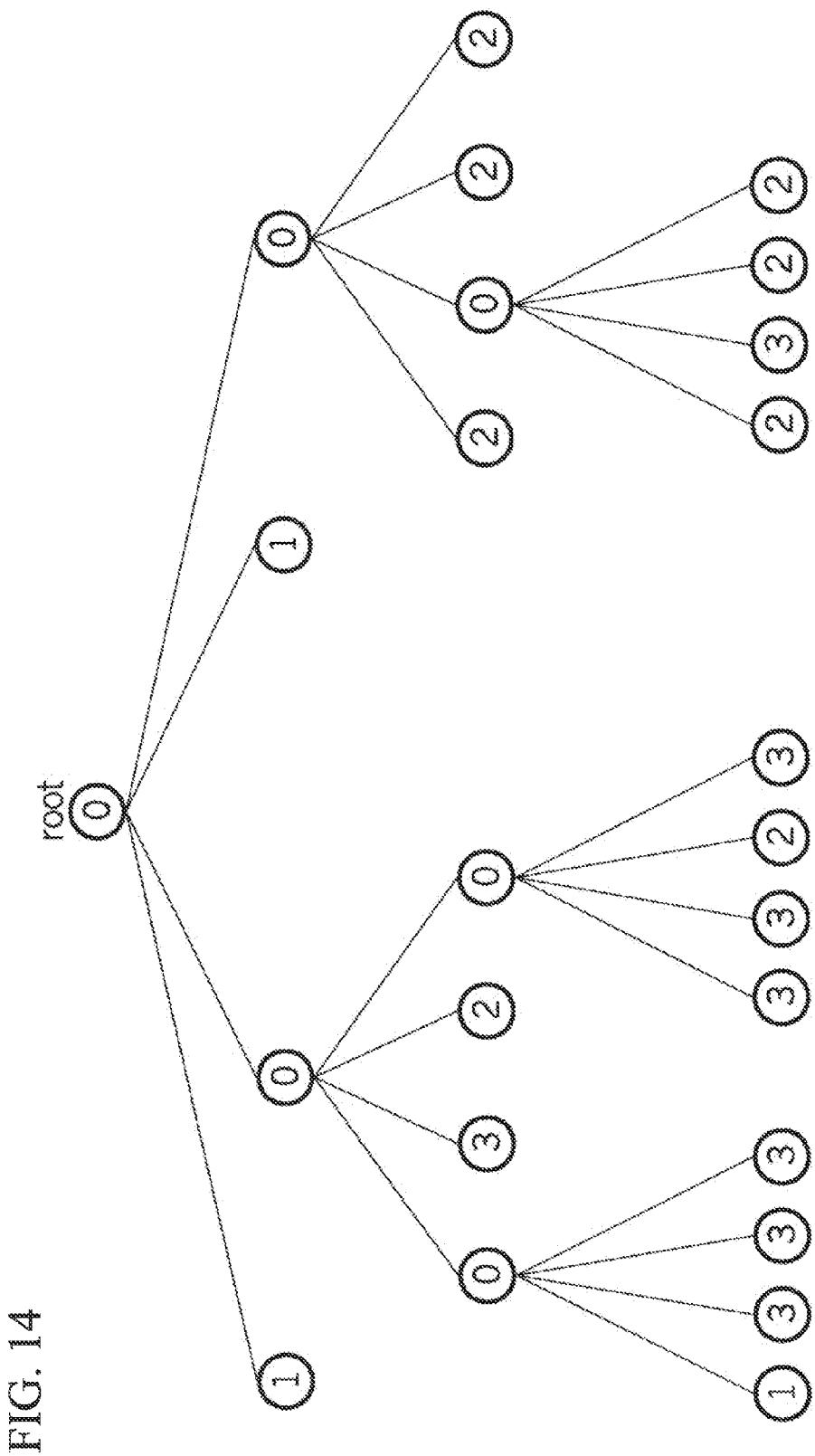
FIG. 14 is a diagram showing an example of the decoded tree-structure object map.

The definition of the tree structure should also be common between the encoding and decoding sides. In an example definition of the tree structure, block blk corresponds to a root, the respective nodes have numbers from 0 to numObjs, and each node to which "0" is assigned has four child nodes. When the numerical sequence was generated by means of scanning using the depth-first search, if a numerical sequence "0100133332033231020232222" is supplied, a tree as shown in FIG. 14 is restored.

After obtaining the tree-structure data, the object map is reconstructed based on the data. In this reconstruction process, the encoding and decoding sides have common definition of the tree structure, and the reconstruction process is executed using the definition.

In an example, the root of the tree represents the entire block blk, and each child node is associated with four sub-blocks (defined in the raster scanning order), which are obtained by dividing the parent node into two equal regions in both the horizontal and vertical directions, where a number, which is obtained by subtracting 1 from a number that is assigned to each node and is other than 0, indicates an object identifier assigned to all pixels included in the relevant block. In this case, an object map as shown in FIG. 15 can be reconstructed from the tree shown in FIG. 14.

The above-described tree structure or definition for the numerical sequence is just an example, and any method can be employed while the encoding and decoding sides can use the same definition.

After completing the decoding of the object map, the predicted image generation unit 307 generates a predicted image of block blk (see step S307). The process in this step is identical to that in step S107 of the first embodiment.

The above-generated predicted image may be subjected to dithering.

In a predicted image generated using the object map and each object pixel value, there are only pixel values the number of which coincides with the object number. Therefore, the predicted image may have characteristics which differ from natural images. Owing to dithering, a variation that more approximates a natural image can be applied to the predicted image.

Although any method for performing dithering can be used, the same method as that employed by the encoding side should be used, where whether or not the dithering is employed should also be common between the encoding and decoding sides. If a parameter required for initializing a dithering apparatus is included in encoded data, it is decoded and used.

After obtaining the predicted image, the image signal of block blk is decoded by the image signal decoding unit 308, and the image signal as a decoded result is output to and simultaneously stored in the decoded image memory 309 (see step S308).

The decoding of the image signal depends on the method employed by the encoding side. If generally known encoding such as MPEG-2 or H.264/AVC is employed, encoded data is subjected to entropy decoding, inverse binarization, inverse quantization, and inverse transformation such as IDCT, so as to decode the prediction residual. The image signal of block blk is reconstructed by adding the predicted image to the decoded prediction residual.

The image signal obtained by the decoding is used for generating or predicting the object number or the object pixel value when decoding another block.

In the third embodiment, although both the object number and the object pixel value are determined by analyzing the pixel values of neighbor pixels for block blk, only one of them may be determined by analyzing the pixel values of neighbor pixels for block blk. In that case, information that has not been determined has been encoded as part of the encoded data and is supplied. That is, the demultiplex unit 303 separates the encoded data corresponding to the information that has not been determined from the entire encoded data, and the separated encoded data is decoded so as to determine the required information.

Figure 16:
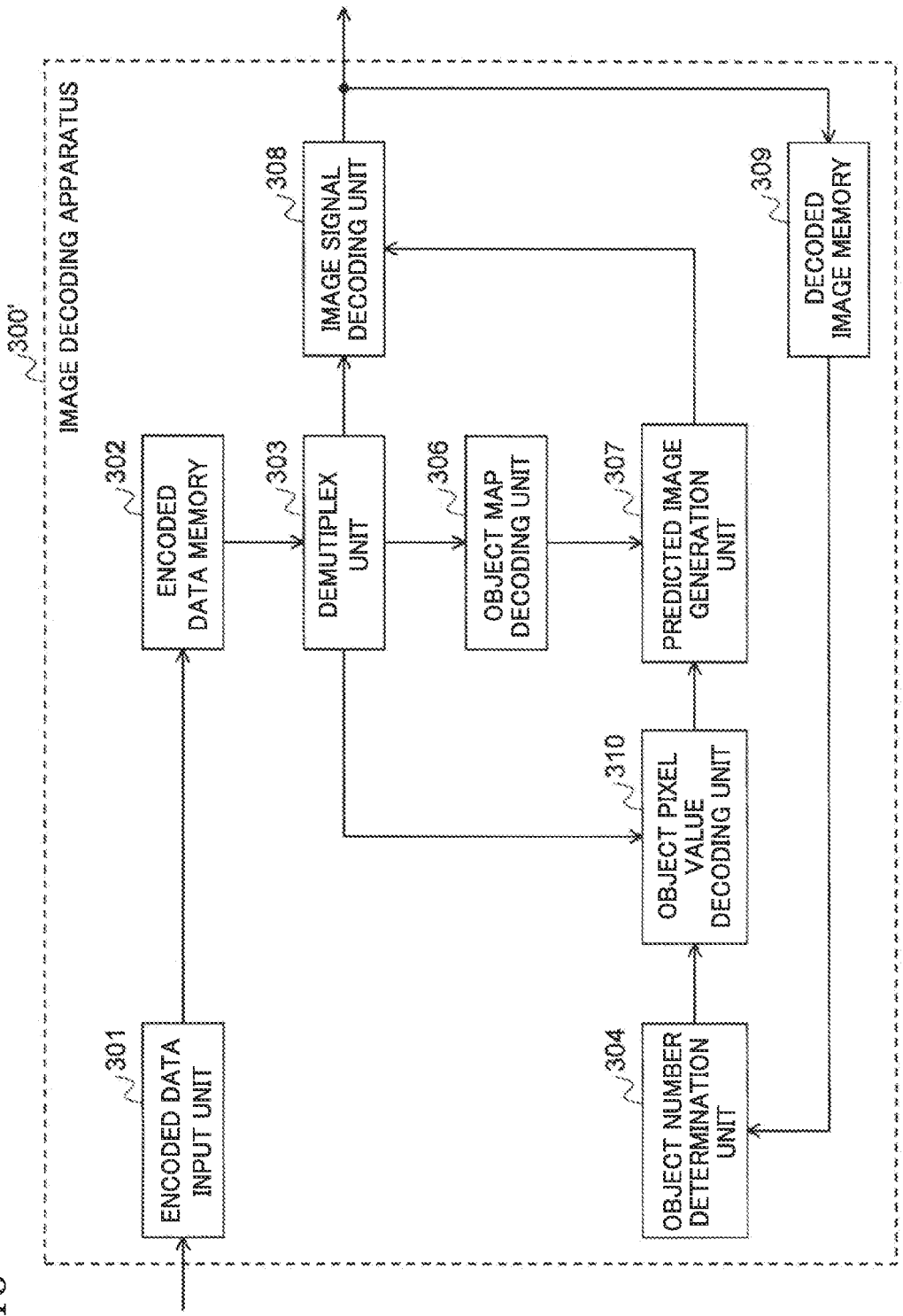
FIG. 16 is a block diagram showing the structure of another image decoding apparatus relating to the third embodiment.

FIG. 16 is a block diagram for the image decoding apparatus employed when analyzing the pixel values of neighbor pixels for block blk so as to determine only the object number, and decoding the object pixel value from the encoded data so as to determine the object pixel value.

In comparison with the image decoding apparatus 300 in FIG. 12, an image encoding apparatus 300' in FIG. 16 has a distinctive feature of having an object pixel value decoding unit 310 instead of the object pixel value determination unit 305, where the object pixel value decoding unit 310 decodes the object pixel value for each object from the encoded data for the object pixel value, which has been separated by the demultiplex unit 303. The other structural elements are identical to those of the image decoding apparatus 300 in FIG. 12.

Fourth Embodiment

Image Decoding Apparatus

Next, a fourth embodiment of the present invention will be explained.

Figure 17:
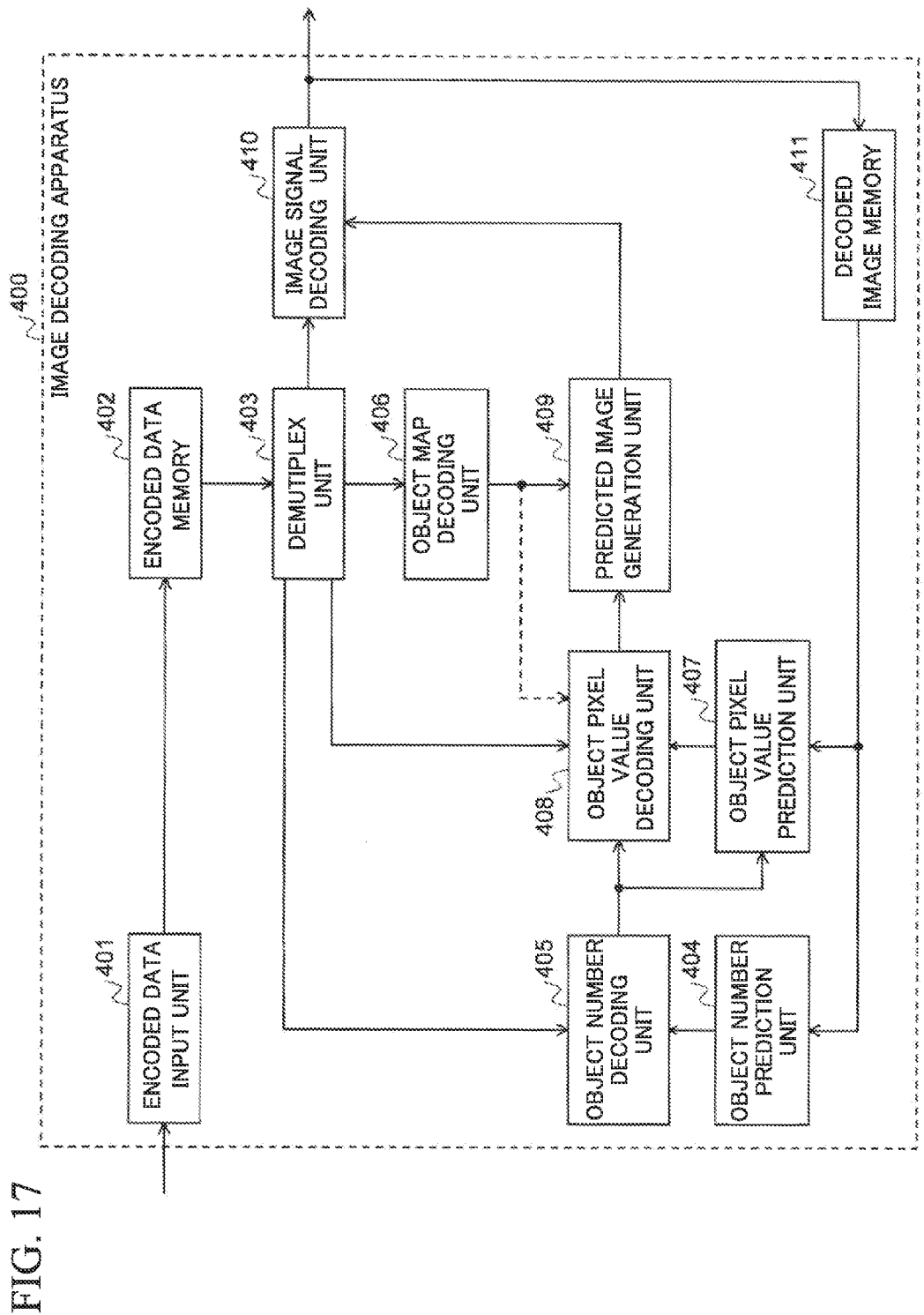
FIG. 17 is a block diagram showing the structure of an image decoding apparatus as the fourth embodiment.

FIG. 17 is a block diagram showing the structure of an image decoding apparatus as the fourth embodiment of the present invention.

As shown in FIG. 17, an image decoding apparatus 400 has an image decoding apparatus 400, an encoded data input unit 401, an encoded data memory 402, a demultiplex unit 403, an object number prediction unit 404, an object number decoding unit 405, an object map decoding unit 406, an object pixel value prediction unit 407, an object pixel value decoding unit 408, a predicted image generation unit 409, an image signal decoding unit 410, and a decoded image memory 411.

The encoded data input unit 401 receives encoded data of an image frame as the decoding target.

The encoded data memory 402 stores the received encoded data.

The demultiplex unit 403 separates multiplexed encoded data into a plurality of encoded data items having different information items.

The object number prediction unit 404 determines a predicted value for the number of objects in a processing region having a predetermined size. This predicted value for the object number is called a "predicted object number".

The object number decoding unit 405 decodes, for each processing region, the object number from the encoded data by using the predicted object number.

The object map decoding unit 406 decodes an object map from the encoded data. The object map is information used for identifying an object obtained at each pixel in the processing region.

The object pixel value prediction unit 407 assumes that a specified number of objects are present in the processing region, and determines a predicted value for each object pixel value by using a decoded image of a neighbor region for the processing region. This predicted value for the object pixel value is called a "predicted object pixel value".

The object pixel value decoding unit 408 decodes, for each processing region, the object pixel value from the encoded data by using the predicted object pixel value.

The predicted image generation unit 409 generates a predicted image for the processing region, based on each object pixel value and the object map for the processing region.

The image signal decoding unit 410 decodes the image signal of the decoding target frame from the encoded data, by using the predicted image for each processing region.

The decoded image memory 411 stores the decoded image signal.

Figure 18:
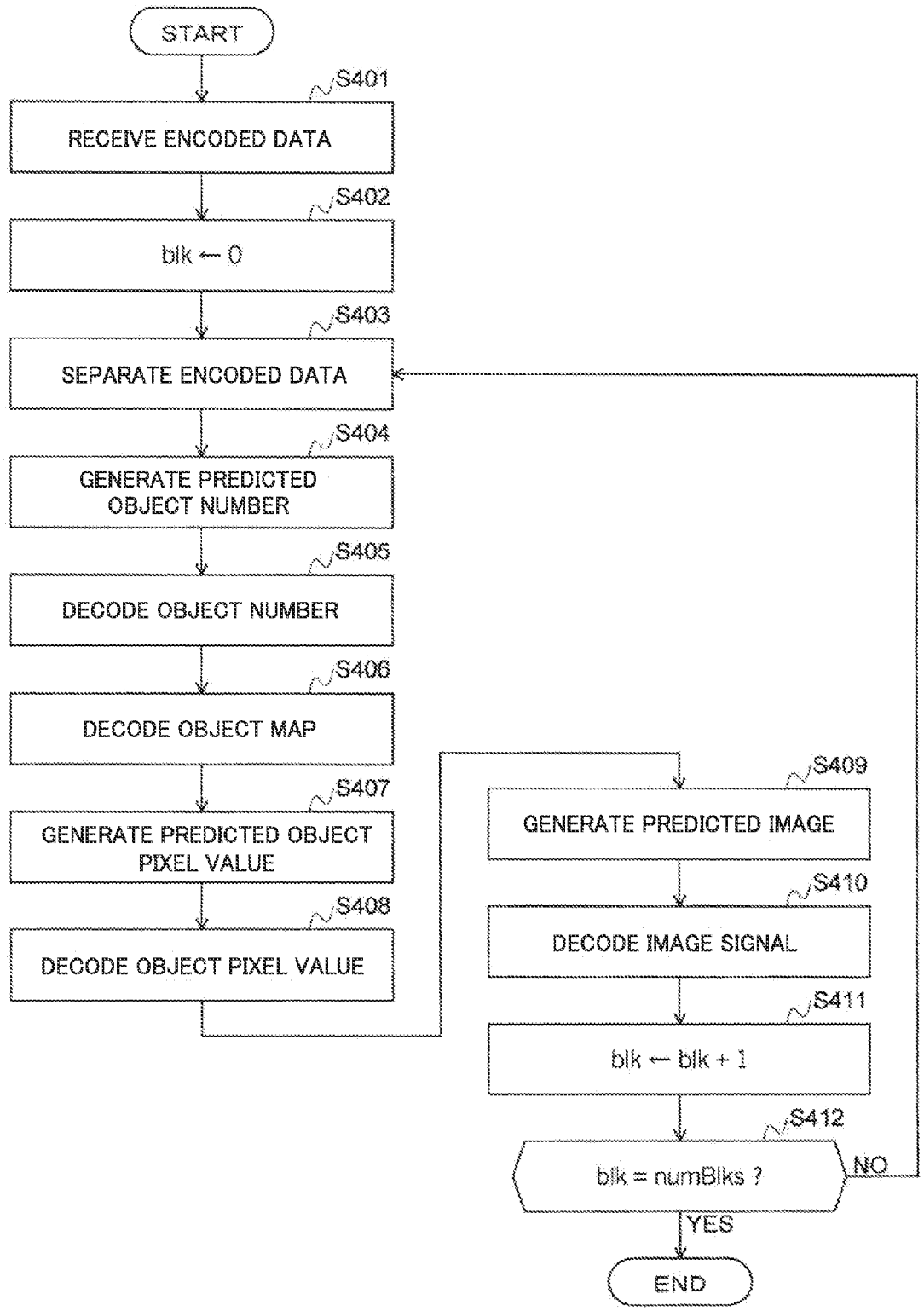
FIG. 18 is a flowchart explaining the operation of the image decoding apparatus in the fourth embodiment.

FIG. 18 is a flowchart explaining the operation of the image decoding apparatus 400 in the fourth embodiment. According to the flowchart, the operation executed by the image decoding apparatus 400 will be explained in detail.

First, the encoded data input unit 401 receives encoded data of the decoding target frame, and stores it into the encoded data memory 402 (see step S401).

After completing the storage of the encoded data, the decoding target frame is divided into regions, and the image signal of the decoding target frame is decoded for each divided area (see steps S402 to S412).

More specifically, given "blk" for a decoding target block index and "numBlks" for the total number of decoding target blocks, blk is initialized to be 0 (see step S402), and then the following process (from step S403 to step S410) is iterated while adding 1 to blk (see step S411) until blk reaches numBlks (see step S412).

In the process iterated for each decoding target block, first, the demultiplex unit 403 separates the received encoded data into encoded data items corresponding to a plurality of information items (see step S403).

In the fourth embodiment, encoded data items of the information items are interleaved for each block. If such interleaving is performed for another processing unit such as a frame, it is unnecessary to iterate the above separation of encoded data for each block.

Next, the object number prediction unit 404 generates the predicted object number of block blk by using image signals of neighbor pixels for block blk, which are stored in the decoded image memory 411 (see step S404).

The set of the neighbor pixels for block blk, which are used as shown above and stored in the decoded image memory 411 is called "first reference pixels".

The above process is identical to that in step S204 of the second embodiment. Any methods shared by the encoding and decoding sides can be used for determining the first reference pixels and for determining the predicted object number based on the pixel values for the first reference pixels.

After completing the generation of the predicted object number, the object number decoding unit 405 decodes the object number from the relevant encoded data by using the predicted object number (see step S405).

The decoding method employed here depends on a corresponding method employed in the encoding. For example, if the encoded data is a code word on a code table, that corresponds to a difference value between the object number and the predicted object number, then the same code table is used so as to obtain a difference value having a code word corresponding to the encoded data. The object number is decoded by adding the obtained difference value to the predicted object number.

Next, the object map decoding unit 406 decodes the object map from the demultiplexed encoded data (see step S406).

The method of decoding the object map depends on a corresponding method employed in the encoding. The process of this step is identical to that in step S306 of the third embodiment.

Next, the object pixel value prediction unit 407 generates predicted object pixel values, the number of which coincides with the object number, by using image signals of neighbor pixels for block blk, which are stored in the decoded image memory 411 (see step S407). The set of the neighbor pixels (used in this step) for block blk, which is stored in the decoded image memory 411, is called the "second reference pixels".

The process of this step is identical to that in step S207 of the second embodiment. Any methods shared by the encoding and decoding sides can be used for determining the second reference pixels and for determining the predicted object pixel value based on the pixel values for the second reference pixels.

After completing the generation of the predicted object pixel value, the object pixel value decoding unit 408 decodes the object pixel value from the relevant encoded data by using the predicted object pixel value (see step S408).

The decoding method employed here depends on a corresponding method employed in the encoding. Some examples will be shown below, where the employed method is known on the decoding side, or communicated to the decoding side using certain additional information.

In an example, the object pixel values and the predicted object pixel values are each placed in the ascending order of their values, and each pair of the object pixel value and the predicted object pixel value is defined in that order. For each pair, a difference value is computed by subtracting the predicted object pixel value from the object pixel value. If the relevant encoded data has been produced using a code word (on a code table) corresponding to the difference value, the same code table is used to obtain the difference value corresponding to the code word. The object pixel value is decoded by adding the corresponding predicted object pixel value to the difference value. The object pixel values are sequentially decoded in such a manner.

In another example, if the difference value has not been directly encoded but was subject to quantization and then encoded, the decoding is performed after executing inverse quantization and then adding the result thereof to the predicted object pixel value.

If there is a quantization parameter which has been encoded, it should be decoded in advance. When using a quantization parameter which was used in another process, the value of the parameter should be communicated to the object pixel value decoding unit 408 in advance.

In another example, predictive encoding has been performed using not only the predicted object pixel value but also a previously-encoded object pixel value for block blk. In such a case, a predicted value for predictive encoding is generated using a same method with that employed on the encoding side, and the generated value is added to a difference value obtained from the encoded data, thereby decoding the object pixel value.

In another example, the object pixel value corresponding to each object identifier that never appears in the object map may not have been encoded. In that case, when the object pixel values are decoded sequentially, an appropriate value may be allocated, as the object pixel value, to an object identifier that never appears in the object map, that is, decoding the object pixel value corresponding to such an object identifier should be skipped.

After completing the decoding of the object pixel value, the predicted image generation unit 409 generates a predicted image of block blk (see step S409). The process in this step is identical to that in step S211 of the second embodiment.

The above-generated predicted image may be subjected to dithering. In a predicted image generated using the object map and each object pixel value, there are only pixel values the number of which coincides with the object number. Therefore, the predicted image may have characteristics which differ from natural images. Owing to dithering, a variation that more approximates a natural image can be applied to the predicted image. Although any method for performing dithering can be used, the same method as that employed by the encoding side should be used, where whether or not the dithering is employed should also be common between the encoding and decoding sides. If a parameter required for initializing a dithering apparatus is included in encoded data, it is decoded and used.

After obtaining the predicted image, the image signal of block blk is decoded by the image signal decoding unit 410, and the image signal as a decoded result is output and simultaneously stored in the decoded image memory 411 (see step S410).

The image signal obtained by the decoding is used for generating or predicting the object number or the object pixel value when decoding another block.

The decoding of the image signal depends on a method employed by the encoding side. If generally known encoding such as MPEG-2 or H.264/AVC is employed, encoded data is subjected to entropy decoding, inverse binarization, inverse quantization, and inverse transformation such as IDCT, so as to decode the prediction residual. The image signal of block blk is reconstructed by adding the predicted image to the decoded prediction residual.

In the fourth embodiment, although the pixel values of neighbor pixels for block blk are analyzed for both the object number and the object pixel value so as to determine the predicted object number and the predicted object pixel value and perform the decoding, only one of the object number and the object pixel value may be decoded using a predicted value determined by analyzing the pixel values of neighbor pixels for block blk, where information to which no predicted value has been applied may be directly decoded from the relevant encoded data without using a predicted value.

FIG. 19 shows an example of syntax applied to encoded data of each block, where the encoded data is generated in the first embodiment and received in the third embodiment.

In FIG. 19, mb_type is information that indicates the prediction mode. When intra prediction of H.264/AVC or the like is also employed, this information is used to determine whether or not the current block is encoded in accordance with the present invention.

In the shown example, if mb_type coincides with MAP_BASED_PRED, it represents that the current block is encoded in accordance with the present invention. If the present invention is applied to all blocks, mb_type and the following conditional branch in the syntax are unnecessary.

In addition, map_object denotes the object map, and "residuals" denotes a prediction residual for the image signal.

In the shown example, "residuals" are present in the "if" block. However, if the prediction residual is encoded regardless of the prediction mode, "residuals" may be present outside the "if" block.

FIG. 20 shows an example of syntax applied to encoded data of each block, where the encoded data is generated in the second embodiment and received in the fourth embodiment.

In FIG. 20, diff_num_objects denotes the prediction residual for the object number, num_objects denotes the object number, exist(i,j) is a function that returns TRUE if object identifier "i" exists in object map "j", otherwise, returns FALSE, and residual_value_object[i] indicates a prediction residual for the object pixel value assigned to the object identifier i.

In the shown example, "residuals" are present outside the "if" block. However, if the prediction residual may not be encoded in accordance with the prediction mode, "residuals" should be present in the "if" block.

Below, examples of the data structure for managing the object number, the object map, and the object pixel value in the embodiments will be explained.

Figure 21A:
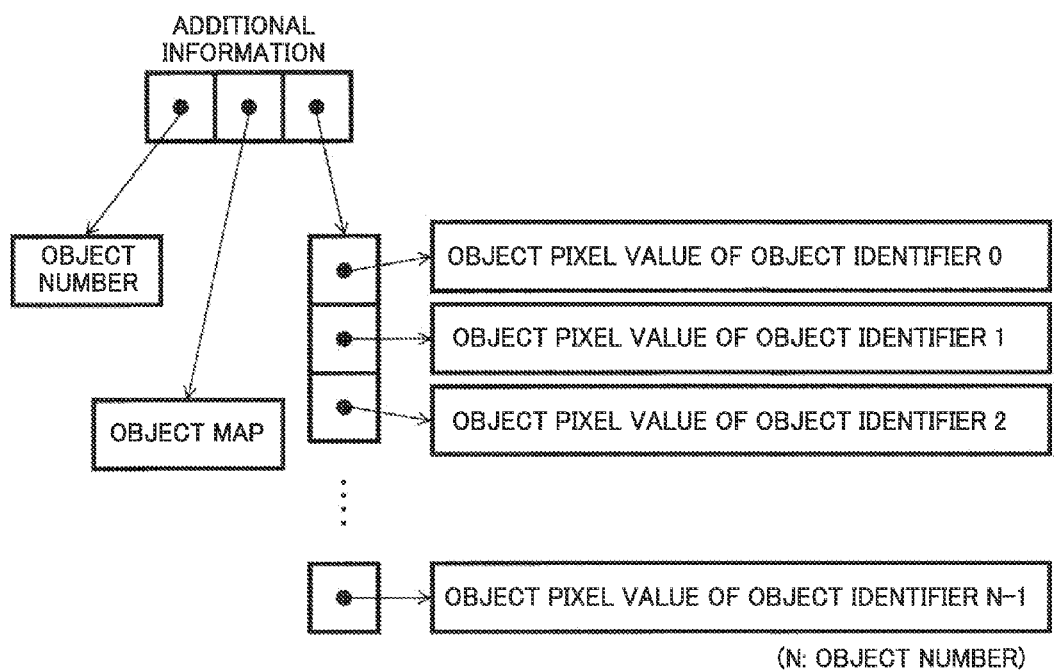
FIG. 21A is a diagram showing an example of the data structure for predicted additional information.
Figure 21B:
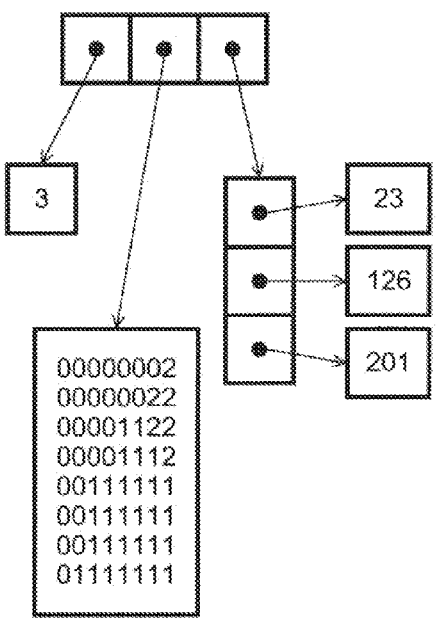
FIG. 21B is a diagram showing a specific example of the above data structure.

FIGS. 21A and 21B are diagrams showing an example of the data structure for the additional information used for generating the predicted image. In the predictive encoding that uses the object pixel value, additional information as shown in an example of FIG. 21A is managed in a memory.

As the above additional information, the object number, the object map, and the object pixel value for each object identifier are defined.

The object number N is an integer. The object map is an integer sequence that may include values from 0 to N−1 and has the same length as the number of pixels in the block. If no prediction is performed, the object pixel value is an integer having no sign. If prediction is performed, the object pixel value is an integer having a sign, that is, negative numbers are considered.

FIG. 21B shows a specific example of the additional information. The object number is 3 and all object identifiers appear in the object map. Therefore, the individual object identifiers have object pixel values.

The object map may be stored as a tree-structure object map whose representation employs a tree-structure format. Such a tree-structure object map is an integer sequence having a variable length. For example, the tree-structure object map in FIG. 8 has an integer sequence of "010101333203323012011122".

In addition, the tree-structure object map may be managed as separate data items such as block division information and in-block object identifier information. The block division information indicates a result of scanning of nodes except for leaf nodes when using the tree-structure object map. The in-block object identifier information indicates a result of scanning of the leaf nodes when using the tree-structure object map.

For example, in case of the tree-structure object map in FIG. 7, the block division information is "0101010011011" and the in-block object identifier information is "0002221221201000111".

Figure 22A:
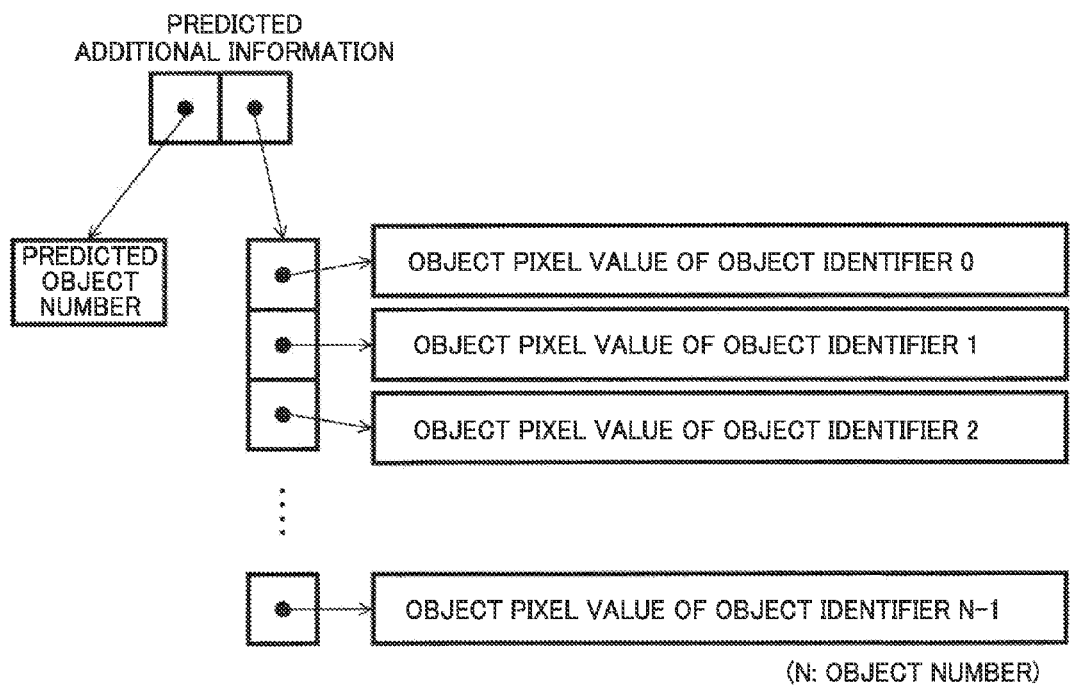
FIG. 22A is a diagram showing an example of the data structure for additional information used for generating the predicted image.
Figure 22B:
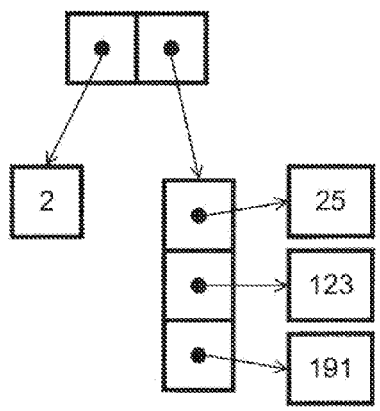
FIG. 22B is a diagram showing a specific example of the above data structure.

FIGS. 22A and 22B are diagrams showing an example of the data structure for the predicted additional information. In the relevant embodiment, the object number or the object pixel value is encoded using a predicted value, and thus the predicted additional information as shown in FIG. 22A is generated.

The predicted object number is an integer, and the predicted object pixel value is an integer having no sign and has the same bit depth as that of the input image.

FIG. 22B shows a specific example therefor. The predicted object number is 2, and the predicted object pixel values assigned to the object identifiers 0, 1, and 2 are respectively 25, 123, and 191.

Based on the above-described information, each encoding target block is encoded. Below, examples of the structure of data encoded in each block will be explained.

First Example of Structure of Data to be Encoded

Figure 23A:
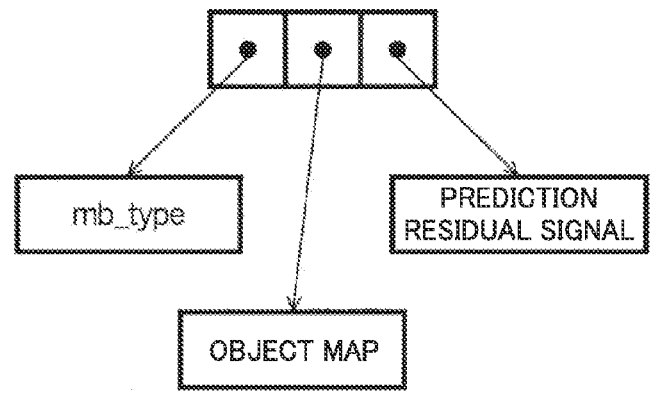
FIG. 23A is a diagram showing the first example of the structure of data encoded in each block.
Figure 23B:
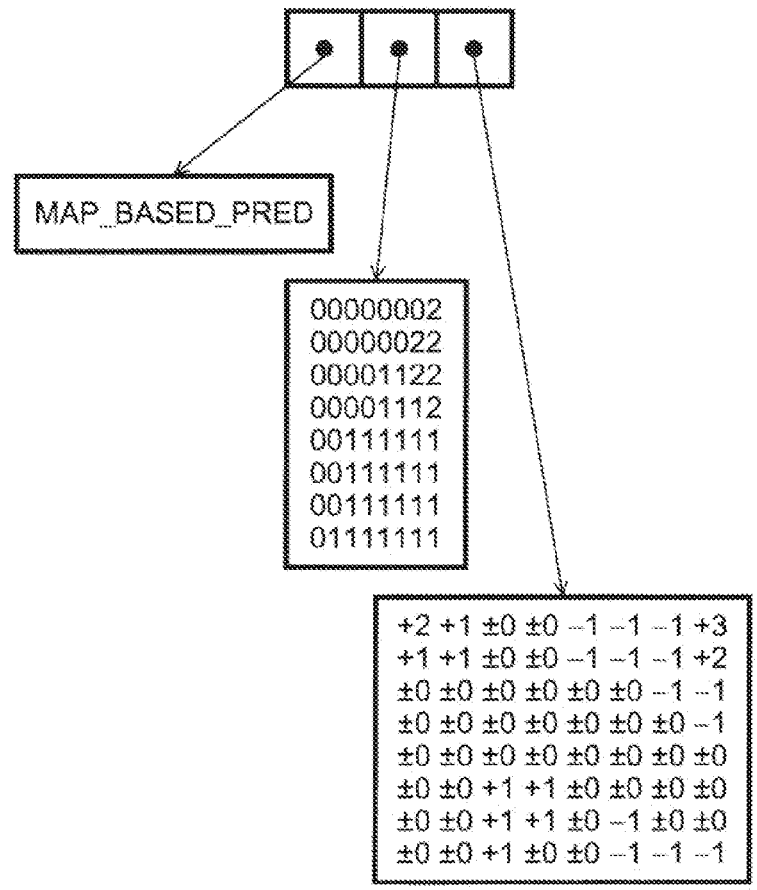
FIG. 23B is a diagram showing a specific example for the above first example of the structure of data.

FIGS. 23A and 23B are diagrams showing the first example of the structure for data to be encoded in each block. This example is applied to the first and third embodiments.

As shown in FIG. 23A, as the additional information for the encoded data, information "mb_type" that indicates the prediction mode, the object map, and a prediction residual signal are defined.

FIG. 23B shows a specific example therefor. When performing the image prediction in accordance with the present invention, the information "mb_type" is MAP_BASED_PRED.

Second Example of Structure of Data to be Encoded

Figure 24A:
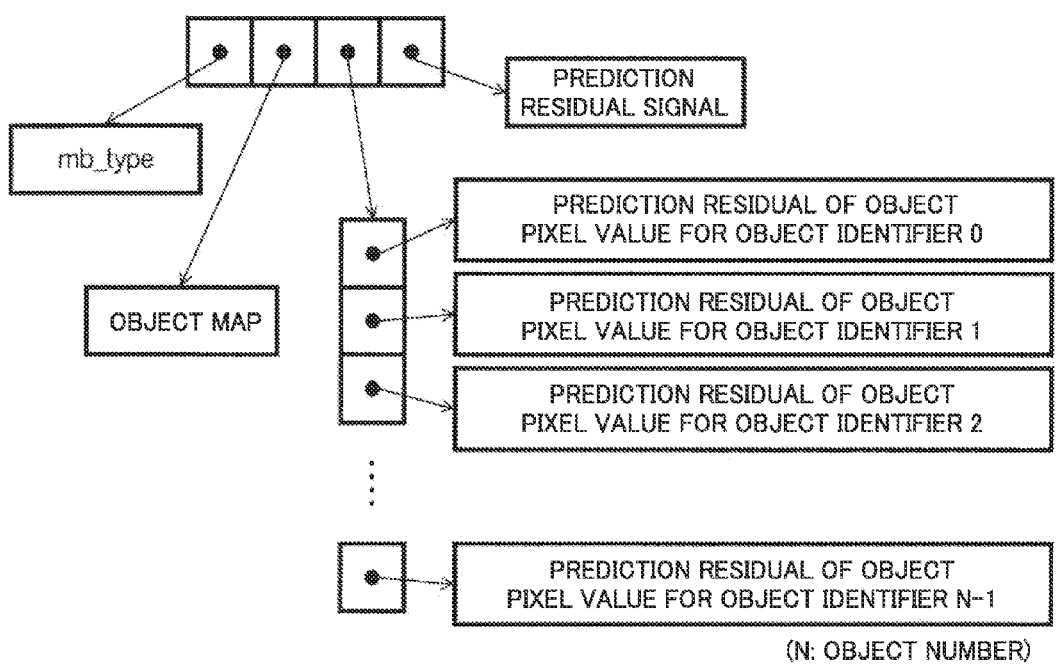
FIG. 24A is a diagram showing the second example of the structure of data encoded in each block.
Figure 24B:
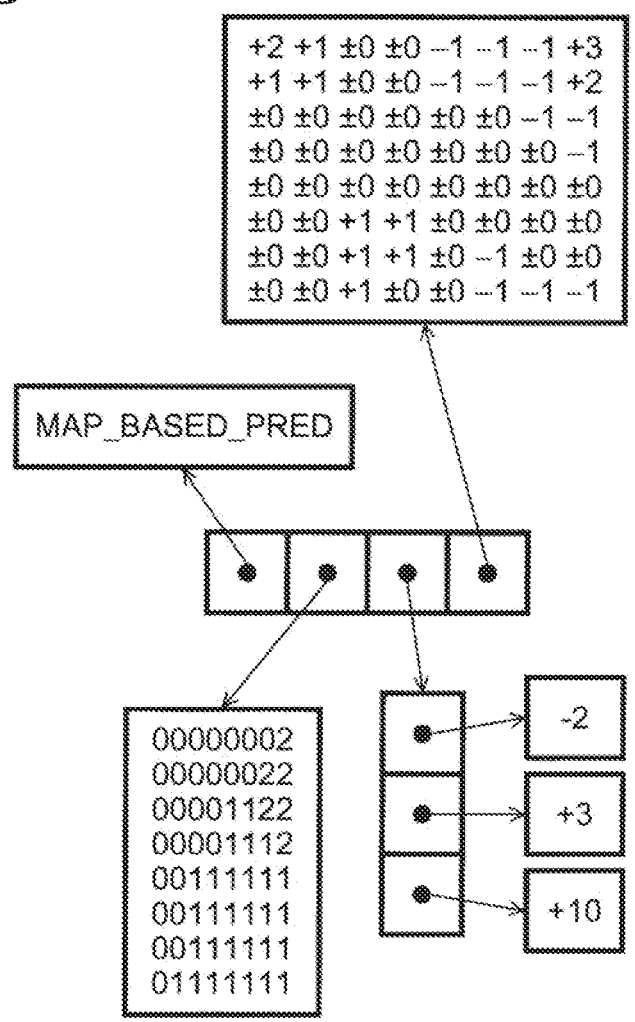
FIG. 24B is a diagram showing a specific example for the above second example of the structure of data.

FIGS. 24A and 24B are diagrams showing the second example of the structure for data to be encoded in each block. This example is effective when only data for the object number is not encoded.

As shown in FIG. 24A, as the additional information for the encoded data, information "mb_type" that indicates the prediction mode, the object map, a prediction residual of the object pixel value for each object, and a prediction residual signal are defined. The prediction residual of the object pixel value for each object is an integer having a sign, and has a bit depth computed by adding 1 to the bit depth of the input image.

FIG. 24B shows a specific example therefor. To object identifiers 0, 1, and 2, values −2, +3, and +10 (as the prediction residual of the respective object pixel values) are assigned.

Third Example of Structure of Data to be Encoded

Figure 25A:
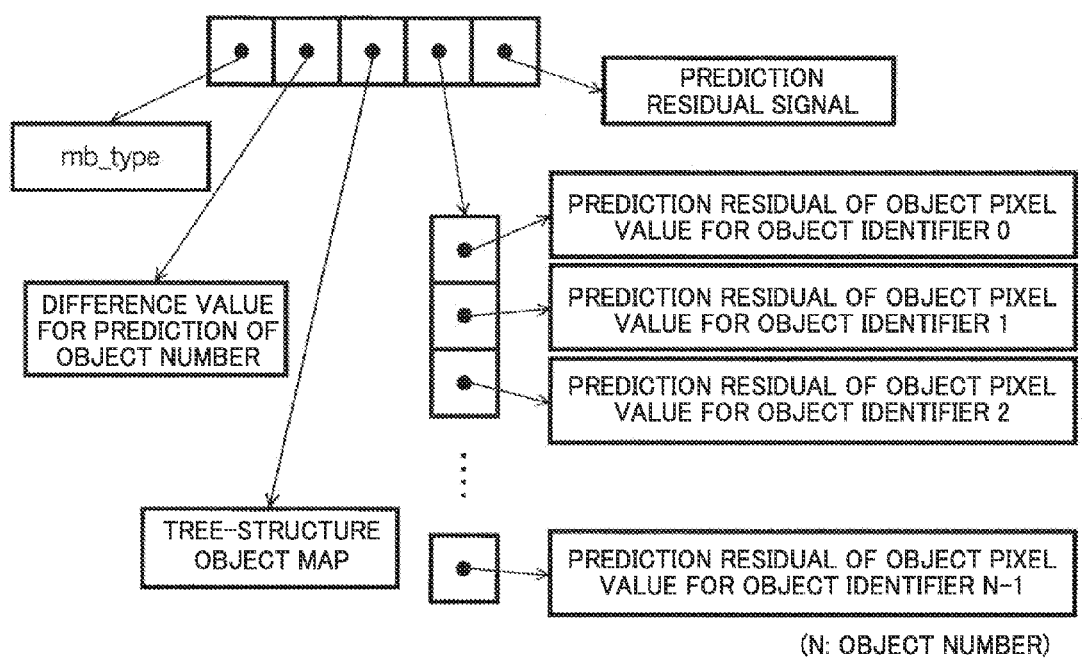
FIG. 25A is a diagram showing the third example of the structure of data encoded in each block.
Figure 25B:
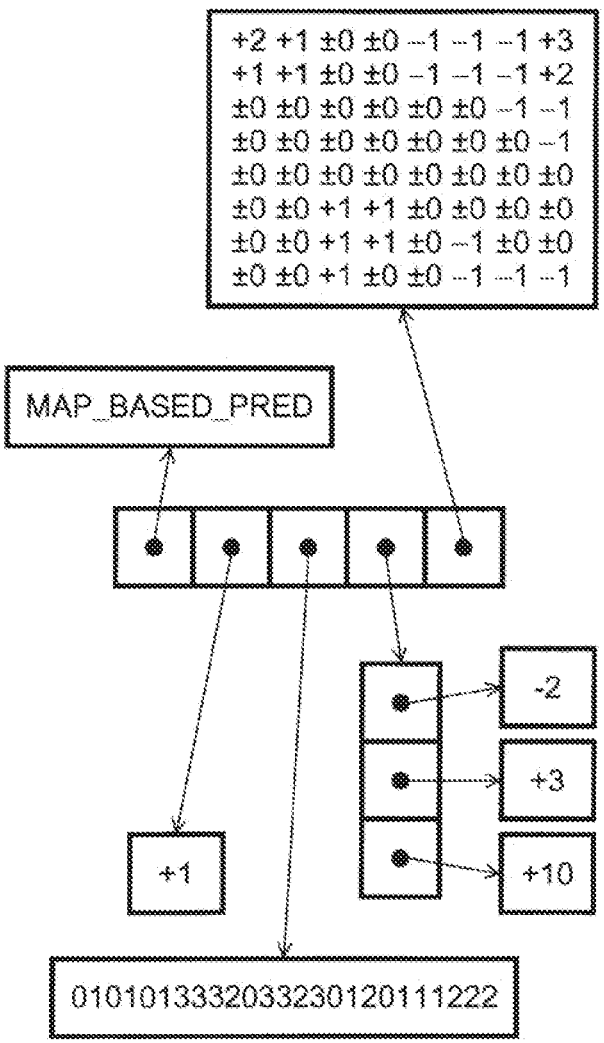
FIG. 25B is a diagram showing a specific example for the above third example of the structure of data.

FIGS. 25A and 25B are diagrams showing the third example of the structure for data to be encoded in each block. This example is applied to the second and fourth embodiments.

As shown in FIG. 25A, as the additional information for the encoded data, information "mb_type" that indicates the prediction mode, a prediction residual of the object number, a tree-structure object map, a prediction residual of the object pixel value for each object, and a prediction residual signal are defined.

FIG. 25B shows a specific example therefor. In this example, the object map is represented using a tree-structure format.

Fourth Example of Structure of Data to be Encoded

Figure 26A:
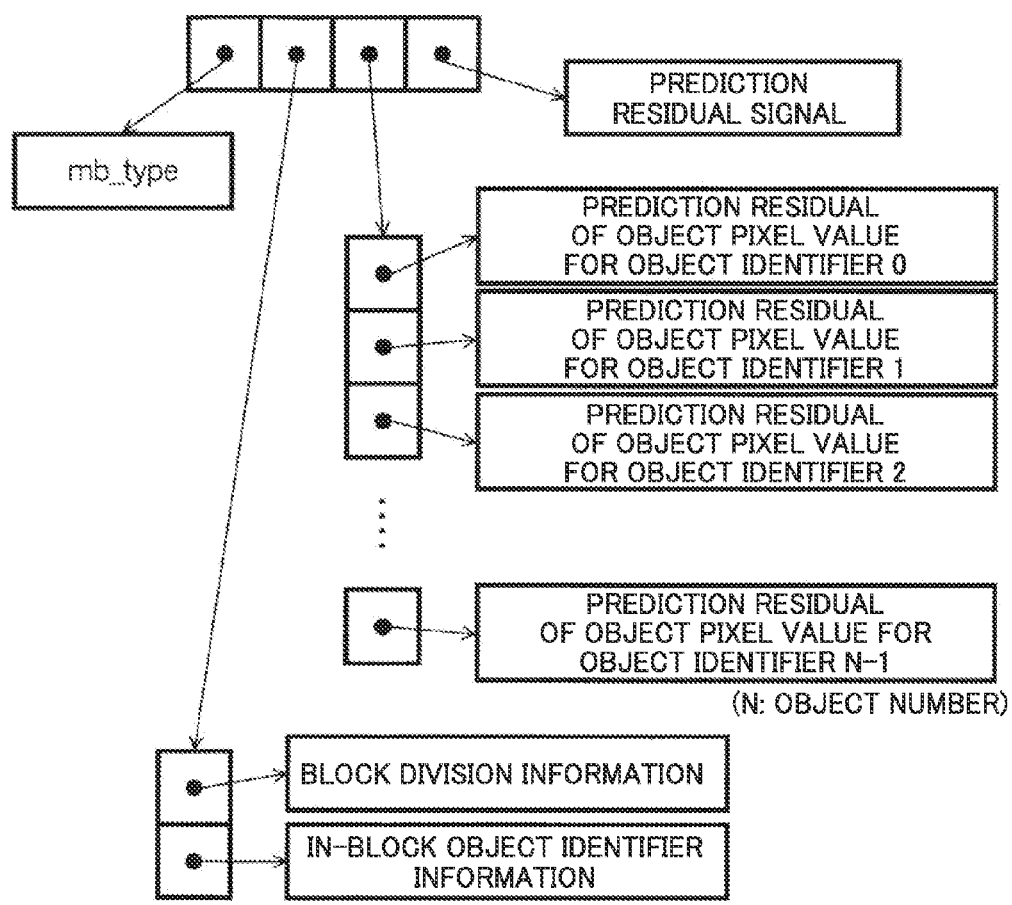
FIG. 26A is a diagram showing the fourth example of the structure of data encoded in each block.
Figure 26B:
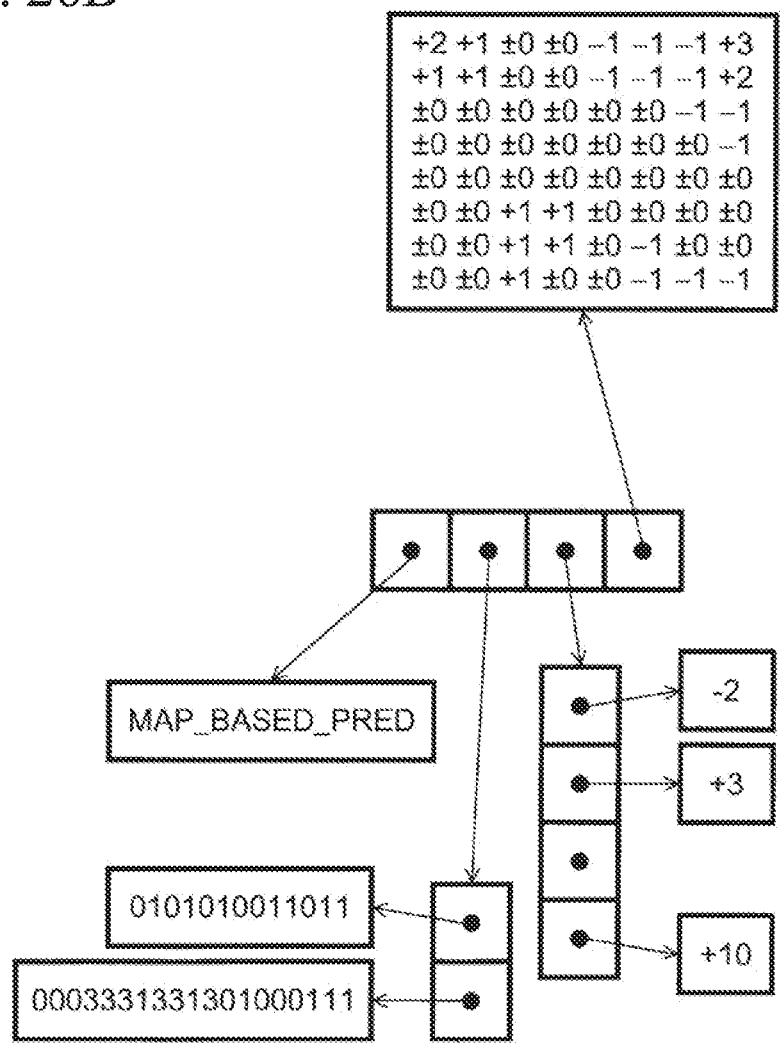
FIG. 26B is a diagram showing a specific example for the above fourth example of the structure of data.

FIGS. 26A and 26B are diagrams showing the fourth example of the structure for data to be encoded in each block. This example is effective when data for the object number is not encoded, and there are object identifier(s) which are not used.

As shown in FIG. 26A, as the additional information for the encoded data, information "mb_type" that indicates the prediction mode, the object map represented using block division information and in-block object identifier information, a prediction residual of the object pixel value for each object, and a prediction residual signal are defined.

FIG. 26B shows a specific example therefor. In this example, since an object identifier of 2 is not used, the predicted value for the corresponding object pixel value is omitted for the data to be encoded.

In the above-described first to fourth embodiments, all blocks in one frame are encoded and decoded in accordance with the claimed invention. However, the relevant processing may be applied to only part of the blocks, and the other blocks may be encoded by means of intra-frame predictive encoding or motion compensation predictive encoding, which is employed by H.264/AVC or the like.

In such a case, it is necessary to encode and decode information that indicates a method employed for each block.

Additionally, in the above-described first to fourth embodiments, one frame is encoded and decoded. However, the claimed invention can be applied to video encoding by iterating the relevant processing for a plurality of frames. In addition, the processing may be applied to part of frames of a video, or part of blocks.

In such a case, since (presence of) an object has not only spatial continuity but also temporal continuity, it can be easily anticipated to extend and use neighbor pixels, not only in the spatial direction but also in the temporal direction.

The above-described image encoding and decoding operations may be implemented using a computer and a software program, where the program may be provided by storing it in a computer-readable storage medium, or through a network.

Figure 27:
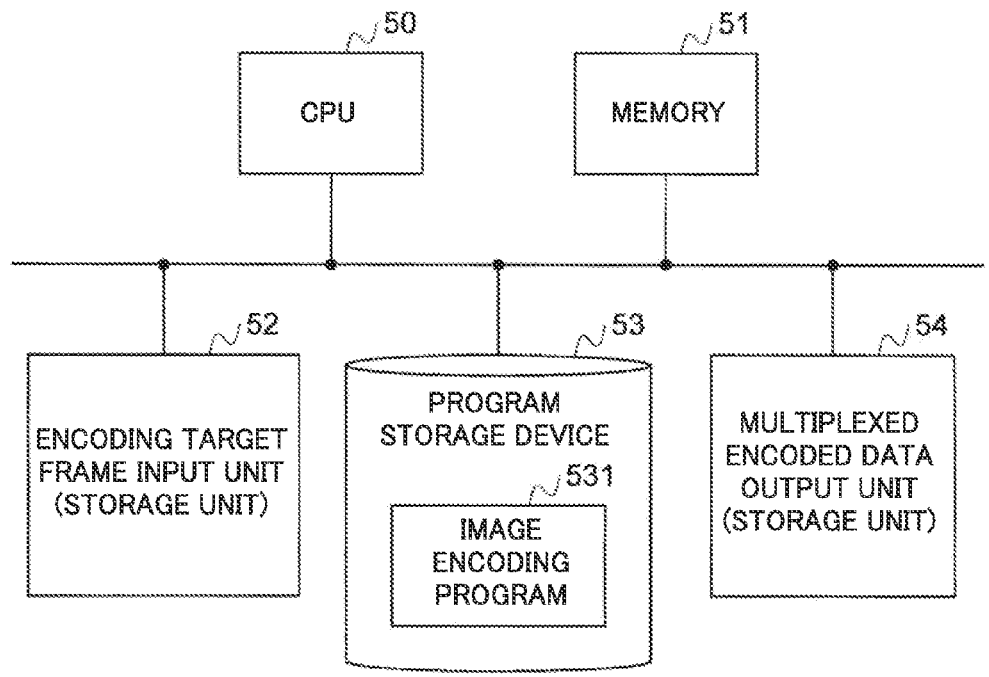
FIG. 27 is a diagram showing an example of a hardware configuration of an image encoding apparatus formed using a computer and a software program.

FIG. 27 shows an example of a hardware configuration of an image encoding apparatus formed using a computer and a software program. In the relevant system, the following elements are connected via a bus:
(i) a CPU 50 that executes the relevant program;
(ii) a memory 51 (e.g., RAM) that stores the program and data accessed by the CPU 50;

(iii) an encoding target frame input unit 52 that receives an image signal of an encoding target from a camera or the like, and may be a storage unit (e.g., disk device) which stores the image signal;
(iv) a program storage device 53 that stores an image encoding program 531 which is a software program for making the CPU 50 execute the operation explained using the drawings such as FIGS. 1 and 2; and
(v) a multiplexed encoded data output unit 54 that outputs multiplexed encoded data via a network or the like, where the encoded data is generated by means of the image encoding program 531 that is loaded on the memory 51 and executed by the CPU 50, and the output unit may be a storage unit (e.g., disk device) which stores the multiplexed encoded data.

In addition, other hardware elements (not shown) are also provided so as to implement the relevant method, which are an object number storage unit, an object map storage unit, an object pixel value storage unit, a predicted image storage unit, an object map encoded data storage unit, an image information encoded data storage unit, a decoded image storage unit, and the like.

In addition, an object pixel value encoded data storage unit may be used, and an object number encoded data storage unit, a predicted object number storage unit, and a predicted object pixel value storage unit may be used.

Figure 28:
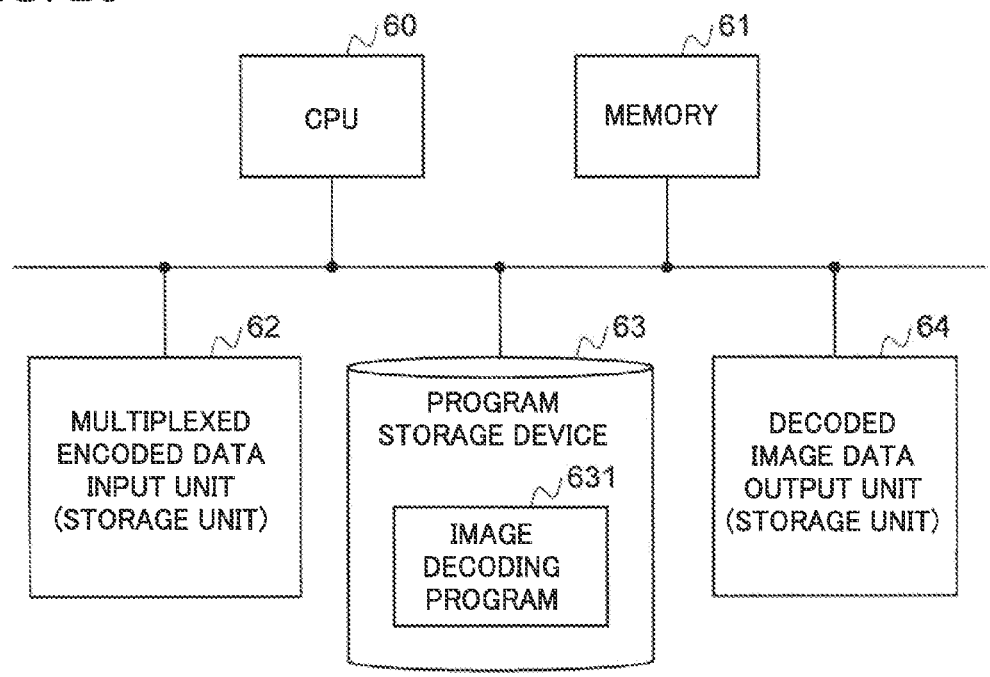
FIG. 28 is a diagram showing an example of a hardware configuration of an image decoding apparatus formed using a computer and a software program.

FIG. 28 shows an example of a hardware configuration of an image decoding apparatus formed using a computer and a software program. In the relevant system, the following elements are connected via a bus:
(i) a CPU 60 that executes the relevant program;
(ii) a memory 61 (e.g., RAM) that stores the program and data accessed by the CPU 60;
(iii) a multiplexed encoded data input unit 62 that receives multiplexed encoded data obtained by an image encoding apparatus which performs the above-explained method, where the input unit may be a storage unit (e.g., disk device) which stores the multiplexed encoded data;
(iv) a program storage device 63 that stores an image decoding program 631 which is a software program for making the CPU 60 execute the operation explained using the drawings such as FIGS. 10 and 11; and
(v) a decoded image data output unit 64 that outputs decoded image data to an image reproduction device or the like, where the decoded image data is obtained by decoding multiplexed encoded data by means of the image decoding program 631 that is loaded on the memory 61 and executed by the CPU 60.

In addition, other hardware elements (not shown) are also provided so as to implement the relevant method, which are an object number storage unit, an object map storage unit, an object pixel value storage unit, a predicted image storage unit, an object map encoded data storage unit, an image information encoded data storage unit, and the like.

In addition, an object pixel value encoded data storage unit may be used, and an object number encoded data storage unit, a predicted object number storage unit, and a predicted object pixel value storage unit may be used.

Verification for Effects

Below, comparison between conventional methods (e.g., H.264/AVC) and the present method (according to the claimed invention) is shown.

1. Conceptual Comparison for Code Amount
1.1 Code Amount Required for Additional Information Additional information in conventional methods is information that indicates direction of each edge and is a two-dimensional vector. In contrast, additional information in the present method is an object map (two-dimensional information). When a block of 16×16 pixels is processed and the object number is 4, the amount of bits required for the present method is approximately 64 times as large as that for the conventional methods, although the evaluation depends on defined conditions. If employing entropy encoding, "64 times" can be reduced to approximately "4 times".

1.2 Code Amount Required for Prediction Residual

In an image having a sharp edge, when a predicted image and an input image have considerably different object shapes, even if a corresponding prediction residual is converted to information in a frequency domain, the information cannot be efficiently concentrated onto a low-frequency area, thereby producing a vary large amount of code required for the prediction residual.

That is, in comparison with the conventional methods which can employ only linear representation, the present method that can represent any shape is able to have a smaller amount of code required for the prediction residual. Specifically, the amount of code required for the prediction residual in the present method can be reduced to a third of that for the conventional methods, although the evaluation depends on a target image or encoding conditions.

1.3 Total Amount of Code

Regarding an ordinary encoding rate, the amount of code required for the prediction residual in the conventional methods occupies 90% of the total amount of code. That is, when the total amount of code is assumed to be "100", the additional is 10 while the prediction residual is 90.

In contrast, when the present method quadruples the additional information and reduces the prediction residual to a third of that for the conventional methods, the total amount of code required for the present method can be 70.

2. Experimental Examples

Figure 29:
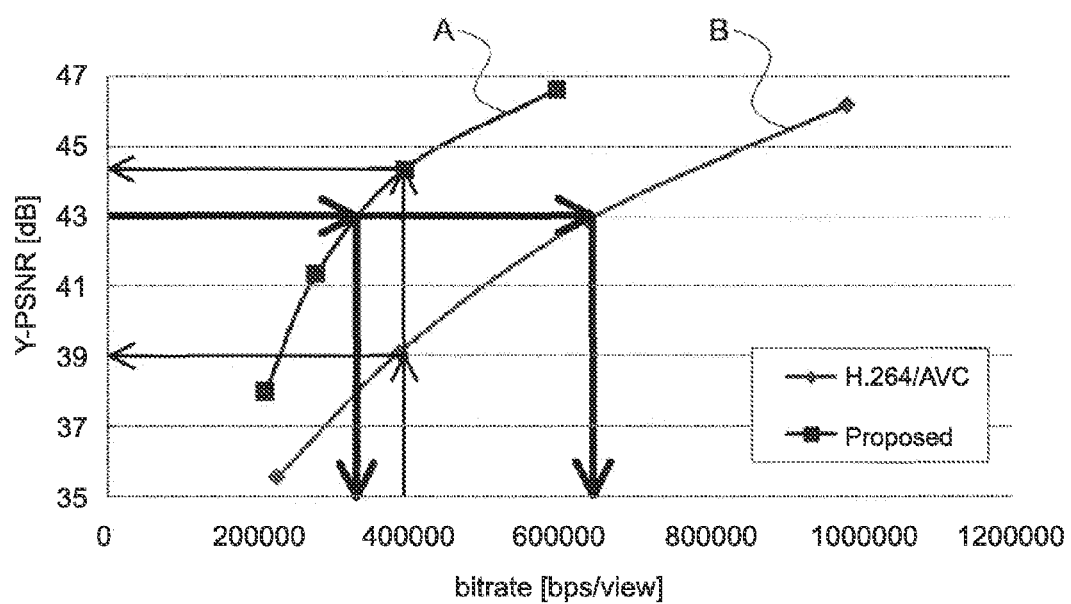
FIG. 29 is a diagram showing results of comparison in the amount of generated code and the image quality when performing the encoding using a conventional method and the present method.
Figure 30:
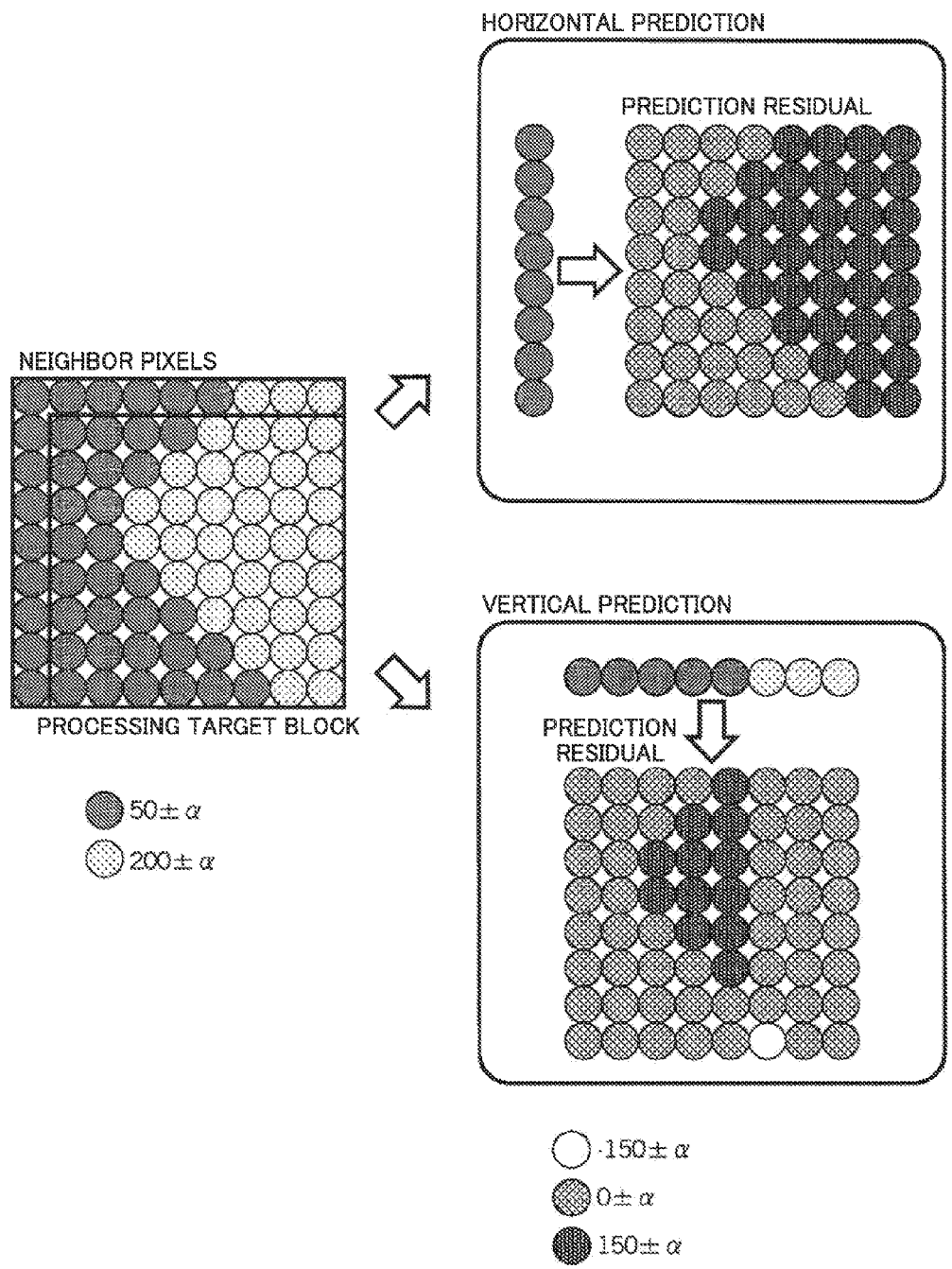
FIG. 30 is a diagram for explaining a problem to be solved by the present invention, where the diagram shows horizontal prediction and vertical prediction for a distance image.
Figure 31A:
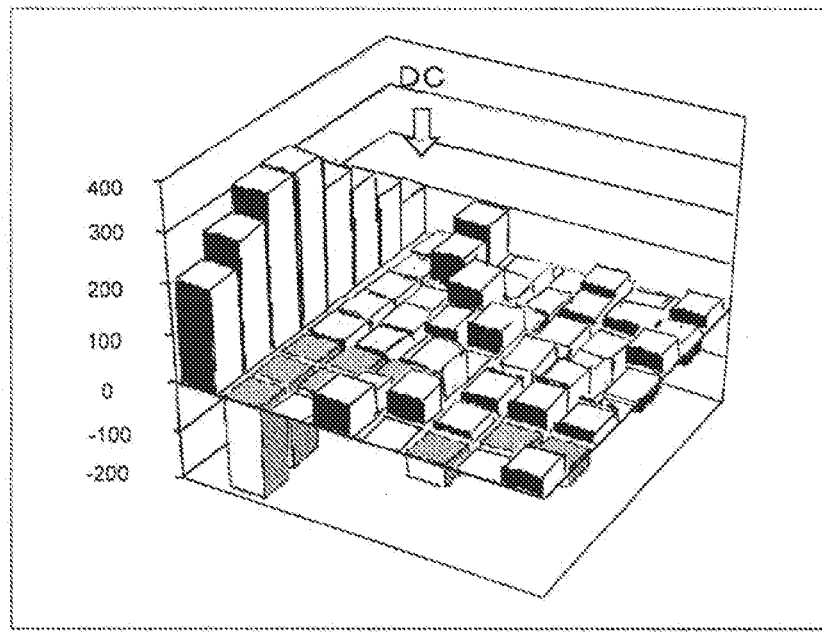
FIG. 31A is a diagram showing a result of subjecting a horizontal prediction residual shown in FIG. 30 to 8×8 two-dimensional DCT.
Figure 31B:
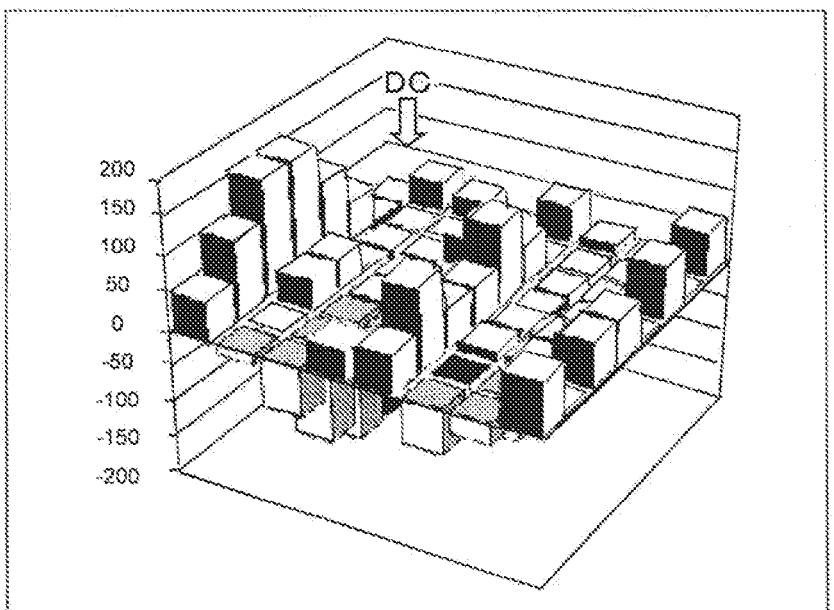
FIG. 31B is a diagram showing a result of subjecting a vertical prediction residual shown in FIG. 30 to 8×8 two-dimensional DCT.

FIG. 29 shows results of comparison in an amount of generated code and image quality between a conventional method and the present method when encoding a sample image.

In the graph of FIG. 29, "Y-PSNR" in the vertical direction indicates quality of the image (unit: dB) while "bitrate" in the horizontal direction indicates the amount of code (unit: bps/view), where the larger the value of Y-PSNR, the higher the image quality.

In FIG. 29, curve A represents a relationship between the amount of code and the image quality for the present method, while curve B represents a relationship between the amount of code and the image quality for the conventional method.

2.1 Interpretation for Code Amount Reducing Effect (Refer to Bold Arrows)

According to the graph of FIG. 29, when Y-PSNR is 43 dB, the conventional method (H.264/AVC) requires a code amount of approximately 650 kbps, while the present method requires a code amount of approximately 325 kbps. Therefore, when performing the encoding which produces the same quality, the present method can achieve a reduction of approximately 50% of the code amount.

2.2 Interpretation for Quality Improving Effect (Refer to Thin Arrows)

According to the graph of FIG. 29, when "bitrate" is 400 kbps, the conventional method (H.264/AVC) produces a quality of approximately 39 dB, while the present method produces a quality of approximately 44.5 dB. Therefore, when performing the encoding with the same code amount, the present method can improve the image quality by 5.5 dB, in other words, achieve a reduction of approximately 72% in the amount of distortion.

While embodiments of the present invention have been described using the drawings, it is evident that these are exemplary embodiments of the claimed invention and are not to be considered as limiting. Therefore, additions, omissions, substitutions, and other modifications can be made without departing from the conceptual and technical scope of the present invention.

INDUSTRIAL APPLICABILITY

In accordance with the present invention, for an image (e.g., distance image) that has pixel values determined considerably depending on objects, and locally has a limited number of objects, when the entire image is divided into regions, each of which is subjected to predictive encoding while predicting an image signal by using an independent method assigned to the region, the object number and a representative pixel value for each object are predicted utilizing spatial continuity for the presence of the object. Accordingly, it is possible to reduce the amount of code required for representing additional information used for the image signal prediction that employs a representative pixel value and object identification information assigned to each object, thereby implementing efficient image coding.

REFERENCE SYMBOLS 100, 200 image encoding apparatus
101, 201 encoding target frame input unit
102, 202 encoding target frame memory
103, 203, 304 object number determination unit
104, 204, 305 object pixel value determination unit
105, 205 object map generation unit
106, 208 object map encoding unit
107, 211 predicted image generation unit
108, 212 image signal encoding unit
109, 213 image signal decoding unit
110, 214 decoded image memory
111, 215 multiplexing unit
112, 210 object pixel value encoding unit
206, 404 object number prediction unit
207 object number encoding unit
209, 407 object pixel value prediction unit
300, 400 image decoding apparatus
301, 401 encoded data input unit
302, 402 encoded data memory
303, 403 demultiplex unit
306, 406 object map decoding unit
307, 409 predicted image generation unit
308, 410 image signal decoding unit
309, 411 decoded image memory
310, 408 object pixel value decoding unit
405 object number decoding unit

The invention claimed is:

1. An image encoding method in which when transmitting or storing an image, a frame of the image is divided into predetermined-sized processing regions, and for each processing region, a pixel value of each pixel is predicted for the encoding, wherein the method comprising:
an object number prediction step that predicts an object number that indicates the number of objects present in the processing region, by using image signals of previously-encoded neighbor pixels for the processing region;
an object pixel value determination step that determines based on the predicted object number, one pixel value, which is assigned to and represents each individual object in the processing region, to be an object pixel value that is associated with an object identifier for identifying the relevant object;
an object map generation step that generates, based on each object pixel value and the pixel value of each pixel in the processing region, an object map that indicates which object has been obtained at each pixel in the processing region, by using the object identifier;
a predicted image generation step that generates a predicted image for the processing region by assigning the object pixel value to each pixel in accordance with the object map;
an object map encoding step that encodes the object map;
an object pixel value encoding step that encodes each object pixel value; and
an image signal encoding step that performs predictive encoding of an image signal for the processing region by using the predicted image.

2. An image encoding method in which when transmitting or storing an image, a frame of the image is divided into predetermined-sized processing regions, and for each processing region, a pixel value of each pixel is predicted for the encoding, wherein the method comprising:
an object number determination step that determines an object number that indicates the number of objects present in the processing region;
an object pixel value prediction step that assumes that objects, the number of which coincides with the determined object number, are present in the processing region, and predicts an object pixel value as a representative pixel value of each individual object, by using image signals of previously-encoded neighbor pixels for the processing region;
an object map generation step that generates, based on each predicted object pixel value and the pixel value of each pixel in the processing region, an object map that indicates which object has been obtained at each pixel in the processing region, by using an object identifier;
a predicted image generation step that generates a predicted image for the processing region by assigning the object pixel value to each pixel in accordance with the object map;
an object map encoding step that encodes the object map;
an image signal encoding step that performs predictive encoding of an image signal for the processing region by using the predicted image.

3. An image encoding method in which when transmitting or storing an image, a frame of the image is divided into predetermined-sized processing regions, and for each processing region, a pixel value of each pixel is predicted for the encoding, wherein the method comprising:
an object number prediction step that predicts an object number that indicates the number of objects present in the processing region, by using image signals of previously-encoded neighbor pixels for the processing region;
an object pixel value prediction step that predicts, based on the predicted object number, an object pixel value as a representative pixel value of each individual object, by using image signals of previously-encoded neighbor pixels for the processing region;
an object map generation step that generates, based on each predicted object pixel value and the pixel value of each pixel in the processing region, an object map that indicates which object has been obtained at each pixel in the processing region, by using an object identifier;
a predicted image generation step that generates a predicted image for the processing region by assigning the object pixel value to each pixel in accordance with the object map;

an object map encoding step that encodes the object map;
an image signal encoding step that performs predictive encoding of an image signal for the processing region by using the predicted image.

4. The image encoding method in accordance with claim 1, further comprising:
an object number determination step that determines one of the predicted object number and an object number determined using image signals of the pixels in the processing region to be an object number; and
an object number encoding step, wherein when the object number determined using the image signals of the pixels in the processing region is determined by the object number determination step, the object number encoding step subjects the determined object number to predictive encoding using the predicted object number or a previously-encoded object number,
wherein the object pixel value determination step determines the object pixel value by assuming that objects, the number of which coincides with the object number determined by the object number determination step, are present.

5. The image encoding method in accordance with claim 3, further comprising:
an object number determination step that determines one of the predicted object number and an object number determined using image signals of the pixels in the processing region to be an object number; and
an object number encoding step, wherein when the object number determined using the image signals of the pixels in the processing region is determined by the object number determination step, the object number encoding step subjects the determined object number to predictive encoding using the predicted object number or a previously-encoded object number,
wherein the object pixel value prediction step predicts the object pixel value by assuming that objects, the number of which coincides with the determined object number, are present in the processing region.

6. The image encoding method in accordance with claim 2 or 3, further comprising:
an object pixel value determination step that determines one of the predicted object pixel value and an object pixel value determined using image signals of the pixels in the processing region to be an object pixel value which is associated with an object identifier for identifying each individual object; and
an object pixel value encoding step, wherein when the object pixel value determined using the image signals of the pixels in the processing region is determined by the object pixel value determination step, the object pixel value encoding step subjects the determined object pixel value to predictive encoding using the predicted object pixel value or a previously-encoded object pixel value,
wherein the object map generation step generates the object map based on the pixel value of each pixel in the processing region and each object pixel value determined by the object pixel value determination step.

7. An image decoding method in which when decoding encoded data of an image, a frame of the image is divided into predetermined-sized processing regions, and for each processing region, a pixel value of each pixel is predicted for the decoding, wherein the method comprising:
an object number prediction step that predicts an object number that indicates the number of objects present in the processing region, by using image signals of previously-decoded neighbor pixels for the processing region;
an object map decoding step that decodes an object map from the encoded data, where the object map indicates the object obtained at each pixel in the processing region, by using an object identifier;
an object pixel value decoding step that decodes, from the encoded data, an object pixel value assigned to each individual object identifier;
a predicted image generation step that generates a predicted image for the processing region by assigning the object pixel value to each pixel in accordance with the object map; and
an image signal decoding step that decodes an image signal for the processing region by using the predicted image.

8. An image decoding method in which when decoding encoded data of an image, a frame of the image is divided into predetermined-sized processing regions, and for each processing region, a pixel value of each pixel is predicted for the decoding, wherein the method comprising:
an object number determination step that determines an object number that indicates the number of objects present in the processing region;
an object map decoding step that decodes an object map from the encoded data, where the object map indicates the object obtained at each pixel in the processing region, by using an object identifier;
an object pixel value prediction step that assumes that objects, the number of which coincides with the determined object number, are present in the processing region, and predicts an object pixel value as a representative pixel value of each individual object, by using image signals of previously-decoded neighbor pixels for the processing region;
a predicted image generation step that generates, based on each predicted object pixel value, a predicted image for the processing region by assigning an object pixel value to each pixel in accordance with the object map; and
an image signal decoding step that decodes an image signal for the processing region by using the predicted image.

9. An image decoding method in which when decoding encoded data of an image, a frame of the image is divided into predetermined-sized processing regions, and for each processing region, a pixel value of each pixel is predicted for the decoding, wherein the method comprising:
an object number prediction step that predicts an object number that indicates the number of objects present in the processing region, by using image signals of previously-decoded neighbor pixels for the processing region;
an object map decoding step that decodes an object map from the encoded data, where the object map indicates the object obtained at each pixel in the processing region, by using an object identifier;
an object pixel value prediction step that predicts, based on the predicted object number, an object pixel value as a representative pixel value of each individual object, by using image signals of previously-decoded neighbor pixels for the processing region;
a predicted image generation step that generates, based on each predicted object pixel value, a predicted image for the processing region by assigning an object pixel value to each pixel in accordance with the object map; and
an image signal decoding step that decodes an image signal for the processing region by using the predicted image.

10. The image decoding method in accordance with claim 7, further comprising:
an object number determination step that determines one of the predicted object number and an object number decoded from the encoded data by using the predicted object number or a previously-decoded object number, to be an object number.

11. The image decoding method in accordance with claim 9, further comprising:
an object number determination step that determines one of the predicted object number and an object number decoded from the encoded data by using the predicted object number or a previously-decoded object number, to be an object number,
wherein the object pixel value prediction step predicts the object pixel value by assuming that objects, the number of which coincides with the determined object number, are present in the processing region.

12. The image decoding method in accordance with claim 8 or 9, further comprising:
an object pixel value determination step that determines one of the predicted object pixel value and an object pixel value decoded from the encoded data by using the predicted object pixel value or a previously-decoded object pixel value, to be an object pixel value; and
the predicted image generation step assigns the object pixel value, which is determined by the object pixel value determination step, to each pixel.

13. An image encoding apparatus in which when transmitting or storing an image, a frame of the image is divided into predetermined-sized processing regions, and for each processing region, a pixel value of each pixel is predicted for the encoding, wherein the apparatus comprising:
an object number prediction device that predicts an object number that indicates the number of objects present in the processing region, by using image signals of previously-encoded neighbor pixels for the processing region;
an object pixel value determination device that determines, based on the predicted object number, one pixel value, which is assigned to and represents each individual object in the processing region, to be an object pixel value that is associated with an object identifier for identifying the relevant object;
an object map generation device that generates, based on each object pixel value and the pixel value of each pixel in the processing region, an object map that indicates which object has been obtained at each pixel in the processing region, by using the object identifier;
a predicted image generation device that generates a predicted image for the processing region by assigning the object pixel value to each pixel in accordance with the object map;
an object map encoding device that encodes the object map;
an object pixel value encoding device that encodes each object pixel value; and
an image signal encoding device that performs predictive encoding of an image signal for the processing region by using the predicted image.

14. An image encoding apparatus in which when transmitting or storing an image, a frame of the image is divided into predetermined-sized processing regions, and for each processing region, a pixel value of each pixel is predicted for the encoding, wherein the apparatus comprising:
an object number determination device that determines an object number that indicates the number of objects present in the processing region;
an object pixel value prediction device that assumes that objects, the number of which coincides with the determined object number, are present in the processing region, and predicts an object pixel value as a representative pixel value of each individual object, by using image signals of previously-encoded neighbor pixels for the processing region;
an object map generation device that generates, based on each predicted object pixel value and the pixel value of each pixel in the processing region, an object map that indicates which object has been obtained at each pixel in the processing region, by using an object identifier;
a predicted image generation device that generates a predicted image for the processing region by assigning the object pixel value to each pixel in accordance with the object map;
an object map encoding device that encodes the object map;
an image signal encoding device that performs predictive encoding of an image signal for the processing region by using the predicted image.

15. An image encoding apparatus in which when transmitting or storing an image, a frame of the image is divided into predetermined-sized processing regions, and for each processing region, a pixel value of each pixel is predicted for the encoding, wherein the apparatus comprising:
an object number prediction device that predicts an object number that indicates the number of objects present in the processing region, by using image signals of previously-encoded neighbor pixels for the processing region;
an object pixel value prediction device that predicts, based on the predicted object number, an object pixel value as a representative pixel value of each individual object, by using image signals of previously-encoded neighbor pixels for the processing region;
an object map generation device that generates, based on each predicted object pixel value and the pixel value of each pixel in the processing region, an object map that indicates which object has been obtained at each pixel in the processing region, by using an object identifier;
a predicted image generation device that generates a predicted image for the processing region by assigning the object pixel value to each pixel in accordance with the object map;
an object map encoding device that encodes the object map;
an image signal encoding device that performs predictive encoding of an image signal for the processing region by using the predicted image.

16. The image encoding apparatus in accordance with claim 13, further comprising:
an object number determination device that determines one of the predicted object number and an object number determined using image signals of the pixels in the processing region to be an object number; and
an object number encoding device, wherein when the object number determined using the image signals of the pixels in the processing region is determined by the object number determination device, the object number encoding device subjects the determined object number to predictive encoding using the predicted object number or a previously-encoded object number, wherein the object pixel value determination device determines the object pixel value by assuming that objects, the number of which coincides with the object number determined by the object number determination device, are present.

17. The image encoding apparatus in accordance with claim 15, further comprising:
an object number determination device that determines one of the predicted object number and an object number determined using image signals of the pixels in the processing region to be an object number; and
an object number encoding device, wherein when the object number determined using the image signals of the pixels in the processing region is determined by the object number determination device, the object number encoding device subjects the determined object number to predictive encoding using the predicted object number or a previously-encoded object number,
wherein the object pixel value prediction device predicts the object pixel value by assuming that objects, the number of which coincides with the determined object number, are present in the processing region.

18. The image encoding apparatus in accordance with claim 14 or 15, further comprising:
an object pixel value determination device that determines one of the predicted object pixel value and an object pixel value determined using image signals of the pixels in the processing region to be an object pixel value which is associated with an object identifier for identifying each individual object; and
an object pixel value encoding device, wherein when the object pixel value determined using the image signals of the pixels in the processing region is determined by the object pixel value determination device, the object pixel value encoding device subjects the determined object pixel value to predictive encoding using the predicted object pixel value or a previously-encoded object pixel value,
wherein the object map generation device generates the object map based on the pixel value of each pixel in the processing region and each object pixel value determined by the object pixel value determination device.

19. An image decoding apparatus in which when decoding encoded data of an image, a frame of the image is divided into predetermined-sized processing regions, and for each processing region, a pixel value of each pixel is predicted for the decoding, wherein the apparatus comprising:
an object number prediction device that predicts an object number that indicates the number of objects present in the processing region, by using image signals of previously-decoded neighbor pixels for the processing region;
an object map decoding device that decodes an object map from the encoded data, where the object map indicates the object obtained at each pixel in the processing region, by using an object identifier;
an object pixel value decoding device that decodes, from the encoded data, an object pixel value assigned to each individual object identifier;
a predicted image generation device that generates a predicted image for the processing region by assigning the object pixel value to each pixel in accordance with the object map; and
an image signal decoding device that decodes an image signal for the processing region by using the predicted image.

20. An image decoding apparatus in which when decoding encoded data of an image, a frame of the image is divided into predetermined-sized processing regions, and for each processing region, a pixel value of each pixel is predicted for the decoding, wherein the apparatus comprising:
an object number determination device that determines an object number that indicates the number of objects present in the processing region;
an object map decoding device that decodes an object map from the encoded data, where the object map indicates the object obtained at each pixel in the processing region, by using an object identifier;
an object pixel value prediction device that assumes that objects, the number of which coincides with the determined object number, are present in the processing region, and predicts an object pixel value as a representative pixel value of each individual object, by using image signals of previously-decoded neighbor pixels for the processing region;
a predicted image generation device that generates, based on each predicted object pixel value, a predicted image for the processing region by assigning an object pixel value to each pixel in accordance with the object map; and
an image signal decoding device that decodes an image signal for the processing region by using the predicted image.

21. An image decoding apparatus in which when decoding encoded data of an image, a frame of the image is divided into predetermined-sized processing regions, and for each processing region, a pixel value of each pixel is predicted for the decoding, wherein the apparatus comprising:
an object number prediction device that predicts an object number that indicates the number of objects present in the processing region, by using image signals of previously-decoded neighbor pixels for the processing region;
an object map decoding device that decodes an object map from the encoded data, where the object map indicates the object obtained at each pixel in the processing region, by using an object identifier;
an object pixel value prediction device that predicts, based on the predicted object number, an object pixel value as a representative pixel value of each individual object, by using image signals of previously-decoded neighbor pixels for the processing region;
a predicted image generation device that generates, based on each predicted object pixel value, a predicted image for the processing region by assigning an object pixel value to each pixel in accordance with the object map; and
an image signal decoding device that decodes an image signal for the processing region by using the predicted image.

22. The image decoding apparatus in accordance with claim 19, further comprising:
an object number determination device that determines one of the predicted object number and an object number decoded from the encoded data by using the predicted object number or a previously-decoded object number, to be an object number.

23. The image decoding apparatus in accordance with claim 21, further comprising:
an object number determination device that determines one of the predicted object number and an object number decoded from the encoded data by using the predicted object number or a previously-decoded object number, to be an object number, wherein the object pixel value prediction device predicts the object pixel value by assuming that objects, the number of which coincides with the determined object number, are present in the processing region.

24. The image decoding apparatus in accordance with claim 20 or 21, further comprising:

an object pixel value determination device that determines one of the predicted object pixel value and an object pixel value decoded from the encoded data by using the predicted object pixel value or a previously-decoded object pixel value, to be an object pixel value; and the predicted image generation device assigns the object pixel value, which is determined by the object pixel value determination device, to each pixel.

25. A non-transitory computer-readable storage medium which stores an image encoding program that makes a computer execute the image encoding method in accordance with any one of claims 1 to 3.

26. A non-transitory computer-readable storage medium which stores an image decoding program that makes a computer execute the image decoding method in accordance with any one of claims 7 to 9.

* * * * *